US011803890B2

(12) United States Patent
Chao et al.

(10) Patent No.: US 11,803,890 B2
(45) Date of Patent: Oct. 31, 2023

(54) METHOD AND SYSTEM FOR CONCURRENT VISUALIZATION TOOL USING AUGMENTED REALITY TO IMPROVE DECISION MAKING

(71) Applicant: Wells Fargo Bank, N.A., San Francisco, CA (US)

(72) Inventors: Waverly W. Chao, San Francisco, CA (US); Haritha Devarajan, Dublin, CA (US); Thomas W. Gross, San Anselmo, CA (US); Kristine Ing Kushner, Orinda, CA (US); Muhammad Farukh Munir, Pittsburg, CA (US); Pamela M. Murphy, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 777 days.

(21) Appl. No.: 15/950,935

(22) Filed: Apr. 11, 2018

(65) Prior Publication Data

US 2019/0318408 A1    Oct. 17, 2019

(51) Int. Cl.
   *G06Q 30/0601*    (2023.01)
   *H04W 4/02*    (2018.01)
   (Continued)

(52) U.S. Cl.
   CPC ....... *G06Q 30/0631* (2013.01); *G02B 27/017* (2013.01); *G06T 19/006* (2013.01); *G06V 20/20* (2022.01); *H04W 4/025* (2013.01)

(58) Field of Classification Search
   CPC ......... G06Q 30/06–08; G06Q 30/0631; G02B 27/017; G06K 9/00671; G06T 19/006; H04W 4/025; G06V 20/20
   (Continued)

(56) References Cited

U.S. PATENT DOCUMENTS 9,366,862 B2    6/2016    Haddick et al.
9,449,343 B2    9/2016    Mayerle et al.
(Continued)

OTHER PUBLICATIONS

Mercari R4D debuts AI vision shopping experience using vuzix blade® AR smart glasses. (Dec. 20, 2018). PR Newswire Retrieved from https://dialog.proquest.com/professional/docview/2158533558?accountid=131444 (Year: 2018).*

*Primary Examiner* — Matthew E Zimmerman
*Assistant Examiner* — Latasha D Ramphal
(74) *Attorney, Agent, or Firm* — Foley & Lardner LLP

(57) ABSTRACT

Examples described herein relate to apparatuses and methods of providing real-time notifications on affordability and advisability of purchasing goods or services using augmented reality. The method includes receiving, from AR device associated with a user, visual data representing a view through a viewing area of the AR device. The visual data comprises geolocation data indicating a geolocation of the AR device. The method includes identifying an image of an object included in the visual data. The method includes determining, based on the visual data, a product identifier associated with the object. The method includes determining an attempt by the user to purchase the object. The method includes generating, in response to determining the attempt, recommendation data based on the product identifier and an account associated with the user. The method includes sending the recommendation data to the AR device to cause the AR device to display the recommendation data to the user.

17 Claims, 9 Drawing Sheets

(51) Int. Cl.
  *G02B 27/01* (2006.01)
  *G06T 19/00* (2011.01)
  *G06V 20/20* (2022.01)

(58) Field of Classification Search
  USPC .............................................. 705/26.1–27.2
  See application file for complete search history.

(56) References Cited

U.S. PATENT DOCUMENTS

| | | |
|---|---|---|
| 9,536,218 B2 | 1/2017 | Soon-Shiong |
| 9,557,162 B2 | 1/2017 | Rodriguez et al. |
| 9,679,332 B2 | 6/2017 | Kim et al. |
| 9,721,386 B1 | 8/2017 | Worley, III et al. |
| 9,759,917 B2 | 9/2017 | Osterhout et al. |
| 9,773,285 B2 | 9/2017 | Calman et al. |
| 9,792,733 B2 | 10/2017 | Rosenthal et al. |
| 9,800,791 B2 | 10/2017 | Shatz et al. |
| 9,818,150 B2 | 11/2017 | Rhoads et al. |
| 9,824,384 B2 | 11/2017 | Li et al. |
| 2012/0206487 A1* | 8/2012 | Suzuki ................. H04N 13/156 345/635 |
| 2016/0196603 A1* | 7/2016 | Perez ...................... G06F 3/013 345/633 |
| 2016/0350813 A1* | 12/2016 | Balasubramanian .. G06Q 50/01 |
| 2017/0091838 A1* | 3/2017 | Cunico .............. G06Q 30/0282 |
| 2017/0168566 A1 | 6/2017 | Osterhout et al. |
| 2017/0213224 A1* | 7/2017 | DeLuca ............. G06Q 30/0625 |
| 2019/0206130 A1* | 7/2019 | Ericson ............. G06Q 30/0643 |

\* cited by examiner

METHOD AND SYSTEM FOR CONCURRENT VISUALIZATION TOOL USING AUGMENTED REALITY TO IMPROVE DECISION MAKING

BACKGROUND

Augmented reality (AR) is the integration of digital information with a user's environment in real-time. Unlike virtual reality, which creates a totally artificial environment, augmented reality uses the existing environment and overlays new information on top of it.

SUMMARY

Aspects of the present disclosure relate generally to an augmented reality device, and more particularly to systems and methods for providing real-time notifications on affordability and advisability of purchasing goods or services using augmented reality.

One implementation disclosed herein is directed to a method of providing real-time notifications on affordability and advisability of purchasing goods or services using augmented reality (AR). In some arrangements, the method includes receiving, by a recommendation server and from an AR device associated with a user, visual data representing a view through a viewing area of the AR device. In some arrangements, the visual data comprises geolocation data indicating a geolocation of the AR device. In some arrangements, the method includes identifying, by the recommendation server, an image of an object included in the visual data. In some arrangements, the method includes determining, by the recommendation server and based on the visual data, a product identifier associated with the object. In some arrangements, the method includes determining, by the recommendation server, an attempt by the user to purchase the object. In some arrangements, the method includes generating, by the recommendation server and in response to determining the attempt, recommendation data based on the product identifier and an account associated with the user. In some arrangements, the method includes sending, by the recommendation server, the recommendation data to the AR device to cause the AR device to display the recommendation data to the user.

In another aspect, the present disclosure is directed to a system for providing real-time notifications on affordability and advisability of purchasing goods or services using augmented reality. In some arrangements, the system includes a recommendation server configured to receive from an AR device associated with a user, visual data representing a view through a viewing area of the AR device. In some arrangements, the visual data comprises geolocation data indicating a geolocation of the AR device. In some arrangements, the system includes a recommendation server configured to identify an image of an object included in the visual data. In some arrangements, the system includes a recommendation server configured to determine, based on the visual data, a product identifier associated with the object. In some arrangements, the system includes a recommendation server configured to determine an attempt by the user to purchase the object. In some arrangements, the system includes a recommendation server configured to generate, in response to determining the attempt, recommendation data based on the product identifier and an account associated with the user. In some arrangements, the system includes a recommendation server configured to send the recommendation data to the AR device to cause the AR device to display the recommendation data to the user.

One implementation disclosed herein is directed to a method of providing real-time notifications on affordability and advisability of purchasing goods or services using augmented reality. In some arrangements, the method includes detecting, by an AR device associated with a user, an observation of an object by a user through a viewing area of the AR device. In some arrangements, the method includes capturing, by the AR device and in response to the detection of the observation, visual data representing a view through the viewing area of the AR device. In some arrangements, the method includes sending, by the AR device, the visual data to a recommendation server, the visual data comprises geolocation data indicating the geolocation of the AR device. In some arrangements, the method includes receiving, by the AR device, recommendation data from the recommendation server. In some arrangements, the recommendation data indicates whether a purchase of the object prevents the user from achieving a predetermined financial milestone associated with the user. In some arrangements, the method includes displaying, by the AR device and in the viewing area of the AR device, the recommendation data to the user. In some arrangements, the method includes detecting, by the AR device and in the viewing area of the AR device, an overlap of the recommendation data and the object. In some arrangements, the method includes moving, by the AR device, the recommendation data to a region of the viewing area of the AR device to avoid the overlap.

These and other features, together with the organization and manner of operation thereof, will become apparent from the following detailed description when taken in conjunction with the accompanying drawings.

BRIEF DESCRIPTION OF THE FIGURES

Like reference numbers and designations in the various drawings indicate like elements.

DETAILED DESCRIPTION

Figure 1:
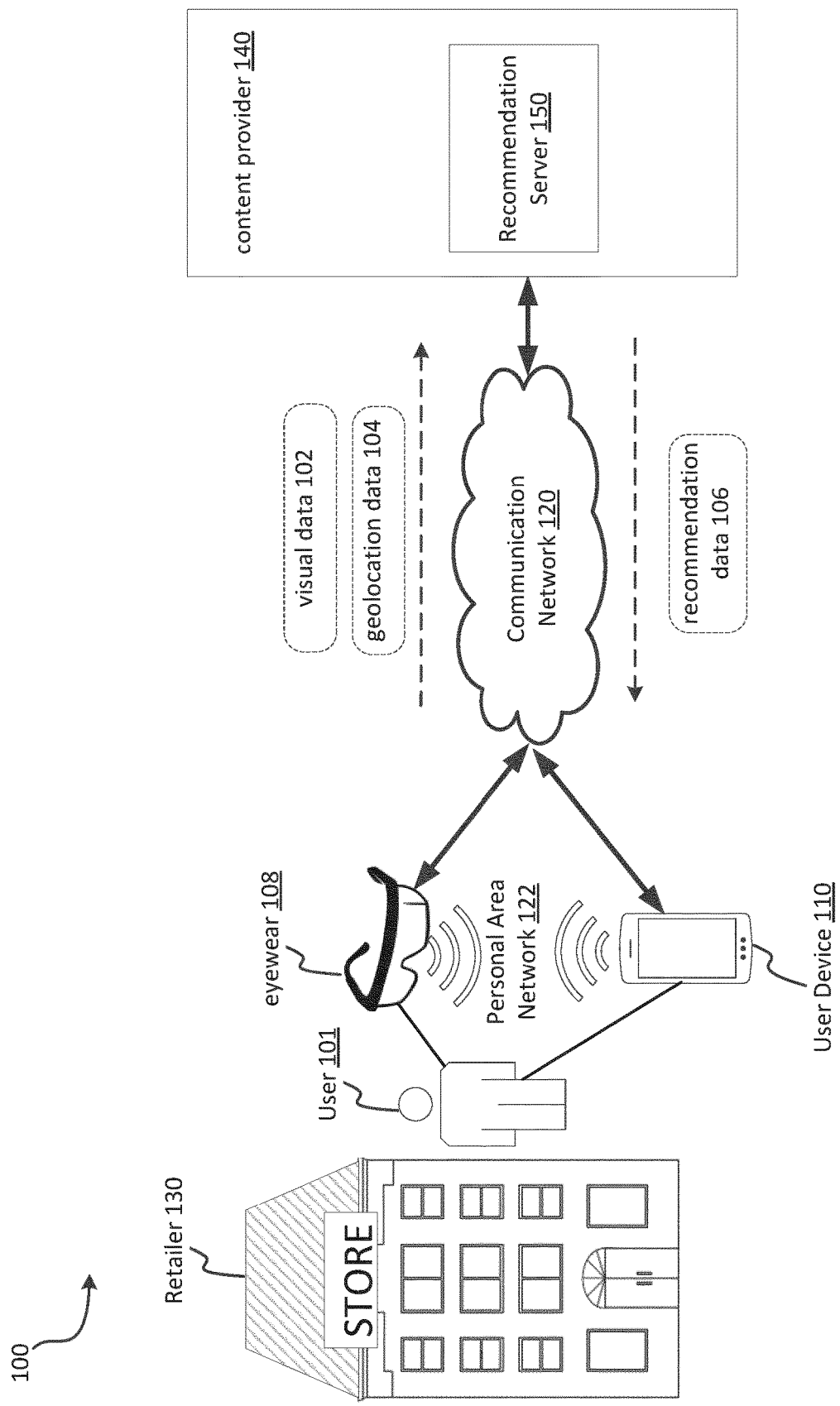
FIG. 1 is a block diagram depicting an example environment for providing real-time notifications on affordability and advisability of purchasing goods or services using augmented reality, according to some arrangements.

Consumers are inundated with many choices when seeking to purchase goods and/or services. For example, a consumer in the market for a new car may find that there are a countless variety of car manufactures, brands, colors, sizes, price points; the list is endless. While having the power of choice usually benefits the consumer, e.g., by lowering prices, an overabundance of choice tends to complicate the consumer's decision-making process. For example, too much choice can cause a consumer to freeze or postpone a purchase out of uncertainty and frustration. And, when they do make a choice, they're more likely to be dissatisfied because they think an unchosen product might have been better. Even worse, a consumer not aware of better purchasing options may make poor purchasing decisions, exceeding the consumer's budget and/or preventing the consumer from achieving a preplanned goal, such as taking that long-awaited vacation with the family. Thus, there exists a long-felt need in providing consumers with real-time assistance and guidance during the purchasing process, without the consumer having to cease viewing the product and leave the retailer in order to receive this assistance.

Accordingly, the present disclosure is directed to systems and methods for providing a consumer with real-time notifications on affordability and advisability of purchasing goods and/or services using augmented reality. By informing the consumer during the purchasing process with real-time notifications, the present disclosure may influence the consumer into making more intelligent purchasing decisions that conform to the consumer's budgetary guidelines and/or the consumer's preplanned goals, and decreasing the time required to make such purchases. The consumer may view research information and/or purchase recommendations that are tailored to the consumer's budgetary capabilities side-by-side with a view of the product; thereby combining the researching process with the viewing process.

The present disclosure also describes system and methods that may detect, in the viewing area of an AR device, an overlap of the real-time notifications on affordability and advisability regarding a product onto the user's view of the product through a viewing area of the AR device. In response, the augmented reality circuit may move the notifications to a region of the viewing area of the AR device to avoid the overlap; thereby overcoming the limitations of the limited viewing space of the AR device.

In general, a consumer (or "user" as described herein) contemplating whether to purchase consumer goods and/or services from a retailer may improve the decision making process by using an AR device, such as eyewear, that is configured to present purchase recommendations to the user in an augmented reality environment. The AR device may generate the purchase recommendations based on an analysis of the user's predetermined milestones and the user's abilities to achieve those milestones. For example, a user wearing eyewear configured with AR functionality may enter a car dealership to browse the new cars that are on display on the car dealer's showroom floor. As the user browses the cars, the eyewear may detect that the user has focused his attention on a particular one of the new cars. In response, the eyewear captures visual data representing the user's view of the new car through a viewing area of the eyewear, retrieves geolocation data indicating the location of both the eyewear and the new car, and sends the visual data and the geolocation data to a recommendation server.

The recommendation server analyzes (e.g., scans) the visual data to identify an image of an object (e.g., the new car) included in the visual data, such as an image of the new car that the user is currently browsing. The recommendation server determines a product identifier (e.g., product type, brand) associated with the object by comparing the image of the object to a database of known objects. The recommendation server then determines that the user is attempting to purchase the object based on determining that the user has repeatedly visited the car dealership or by discovering from text messages, emails, social media accounts, and the like that user has indicated an interest in purchasing the object. In response, the recommendation server generates recommendation data and sends the recommendation data to the eyewear to cause the eyewear to display information alongside the object that the user is looking at. The recommendation data may show account information, tax information, payment information, price, affordability, projected happiness, and other account health information to either discourage or encourage the user to purchase the object.

FIG. 1 is a block diagram depicting an example environment 100 for providing real-time notifications on affordability and advisability of purchasing goods or services using augmented reality, according to some arrangements. The environment 100 includes a retailer 130 (e.g., retail store, department store, app store, market, warehouse, auction, etc.) that offers consumer goods and/or services to customers (e.g., user 101) for rent, lease and/or purchase. In some arrangements, the retailer 130 may be an individual. In some arrangements, the retailer 130 may offer real estate for rent, lease and/or purchase. The retailer 130 may display the consumer goods and/or services or descriptions of the consumer goods and/or services in any location viewable by a consumer, such as inside and/or outside (e.g., open lot) of a brick and mortar location, on an online webpage, on a sign, or in a physical document (e.g., publication, article, coupon, catalog, etc.). The consumer goods and/or services (and/or their descriptions) may include any identifier (herein referred to as a "product identifier") that distinguishes the product from other products and/or services, such as a barcode, a Quick Response Code ("QR code"), an international standard book number (ISBN), a mark, a label, a symbol, a signature, or any other identifier that indicates a product type, a product manufacturer, a product brand, a product color, a product price, a product tax, product dimensions, a product quantity, a product quality rating, a service provider, a service quality rating, etc. For example, a car may have a document affixed to its window and the document may include a description of the car and the price (including taxes) to purchase the car.

The environment 100 includes a user 101 who is associated with (e.g., wears, holds, controls, etc.) eyewear 108 for browsing (e.g., viewing, observing) the consumer goods and/or services offered by the retailer 130 for rent, lease, and/or purchase through a viewing area (e.g., viewing area 304a of FIG. 3A) of the eyewear 108, to determine whether to rent, lease, or purchase the product and/or service. The eyewear 108 may be any accessory worn on or over the eyes, such as glasses, sunglasses, goggles, and contact lens. Although the eyewear 108 is used throughout as an example of an augmented reality device, other examples (e.g., a smart phone) of the augmented reality device can be likewise implemented. That is, the eyewear 108 may be any type of AR device (or AR visualization tool) that allows a user to view through a viewing area to view any portion of the user's 101 existing environment, and overlay/superimpose new information on top of it. The eyewear 108 includes electronic circuitry (as discussed herein with respect to FIG. 2B) for sending visual data (e.g., visual data 102) and/or geolocation data (e.g., geolocation data 104) to a computing device (e.g., recommendation server 150, user device 110, laptop, another eyewear 108) and receiving recommendation data (e.g., recommendation data 106) from the recommendation server 150. In some arrangements, visual data 102 may include geolocation data 104.

In some arrangements, the eyewear 108 may include any type of AR device that includes or controls a viewing area, such as a smartphone that controls content displayed (or projected) on a screen, a vehicle (e.g., car, boat, airplane, etc.) that controls content displayed (or projected) on one or more of its windows, or any type of AR device that controls content displayed on any screen (e.g., touchscreen, light emitting diode (LCD), etc.), or projected onto a non-screen surface (e.g., any portion of the human body, on a credit card, on wall/floors of a building, and/or on any portion of landscape (e.g., trees, sky, ground, clouds, etc.).

The eyewear 108 may include one or more cameras (e.g., digital camera, video camera) for capturing visual data (e.g., still images or digital video) representing the user's 101 view through a viewing area (e.g., viewing area 304a of FIG. 3A) of the eyewear 108. In the arrangements in which the augmented reality device is a smart phone, the smart phone may include one or more cameras (e.g., digital camera, video camera) for capturing visual data (e.g., still images or digital video) representing the user's 101 view through a viewing area (e.g., a viewing area on a touchscreen display) of the smart phone. The eyewear 108 may include a geolocation detection circuit (geolocation detection circuit 210 in FIG. 2B) for detecting the geolocation of the eyewear 108. The environment 100 includes a content provider 140 that manages a recommendation server 150 for delivering recommendation data (e.g., recommendation data 106) to eyewear 108 in response to receiving visual data 102 and/or geolocation data 104 from eyewear 108. An example content provider 140 includes a commercial company/bank, loan office, mortgage office, an investment company/bank, a management investment company, a non-bank institution (e.g., savings and loans, credit union, shadow bank), a brokerage office, a credit card company, automatic teller machine (ATM) location, an insurance company, a medical provider, a charitable organization, combinations thereof, and/or the like. Other examples include trusted persons such as a banker, investment officer, trust attorney, custodian, etc. Other examples include trusted digital personas, which may have been built and trained by the user, or trusted persons. In some arrangements, content provider 140 may communicate with eyewear 108 via user device 110. For example, eyewear 108 may send visual data 102 and/or geolocation data 104 to user device 110, causing user device 110 to send visual data 102 and/or geolocation data 104 to content provider 140. In response, content provider 140 sends recommendation data 106 to user device 110, causing user device 110 to send the recommendation data 106 to user 101.

In some arrangements, the environment 100 may include a user device 110 capable of sending/receiving visual data 102, geolocation data 104, and recommendation data 106 over communication network 120. An example user device 110 includes personal computers (e.g., desktop or laptop), mobile communication devices (e.g., smartphones or tablets), video game console, servers, and other devices that can send and receive data over communication network 120.

The environment 100 includes a communication network 120 that connects eyewear 108 and user device 110 to one or more recommendation servers 150. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like between the eyewear 108, the user device 110, and the recommendation server 150. Although not illustrated, in many arrangements, communication network 120 may comprise one or more intermediary devices, including gateways, routers, firewalls, switches, network accelerators, Wi-Fi access points or hotspots, or other devices. In some arrangements, eyewear 108 and user device 110 may directly communicate via a personal area network 122 (e.g., Bluetooth, infrared, Wi-Fi, etc.)

The environment 100 may include many thousands of users 101 (each wearing a pair of eyewear 108), retailers 130, user devices 110, and content providers 140 that are interconnected via communication network 120. In some arrangements, environment 100 may include subsets of content providers 140 where each content provider 140 within a subset is interconnected to another content provider 140 via communication network 120, but communicatively unavailable (e.g., disconnected, isolated, fire-walled) to content providers 140 of another subset. As such, each content provider 140 within a subset may share some or all of its stored data that is associated with the eyewear 108 and/or user device 110 connected to that subset, such as user interaction data, visual data 102, geolocation data 104, recommendation data 106, user device identifiers, session identifiers, and account data.

In some arrangements, the user 101 is an account holder of at least one account managed by the content provider 140. An example account may include a checking account, a savings account, a credit account, an investment account, a retirement account, a brokerage account, a mortgage account, a rewards account, and the like. Such accounts may include information (referred to herein as "account information") indicating account balances, account activities, profile information (e.g., contact information of user 101, contact information of other users 101 associated with other eyewear 108), invoices, rewards associated with the account, bill payment information, transaction history, autopay preferences, income, debt, reoccurring expenses, savings, mortgage amount and payments, and predetermined financial milestones. An example predetermined financial milestone (or preplanned goal) may include a vacation goal, a savings goal, a goal to purchase a particular product, a goal to contract for a particular service, a retirement goal, a mortgage goal, a career goal, an education goal, a family goal (e.g., marriage, having children, etc.), or any other goal associated with or involve the finances of user 101.

The content provider 140 may facilitate various types of transactions between the user 101 and other parties (e.g., retailer 130). That is, the user 101 operates the user device 110 to access products and/or services provided by the retailer 130. According to a non-limiting example, the user 101 can use a mobile wallet or online payment features provided by the content provider 140 to pay for the goods or services offered by other parties. The mobile wallet or online payment features are provided through software applications on the user device 110. In some arrangements, the eyewear 108 may send transaction requests to the software applications executing on the user device 110 to initiate transactions with retailer 130.

Figure 2A:
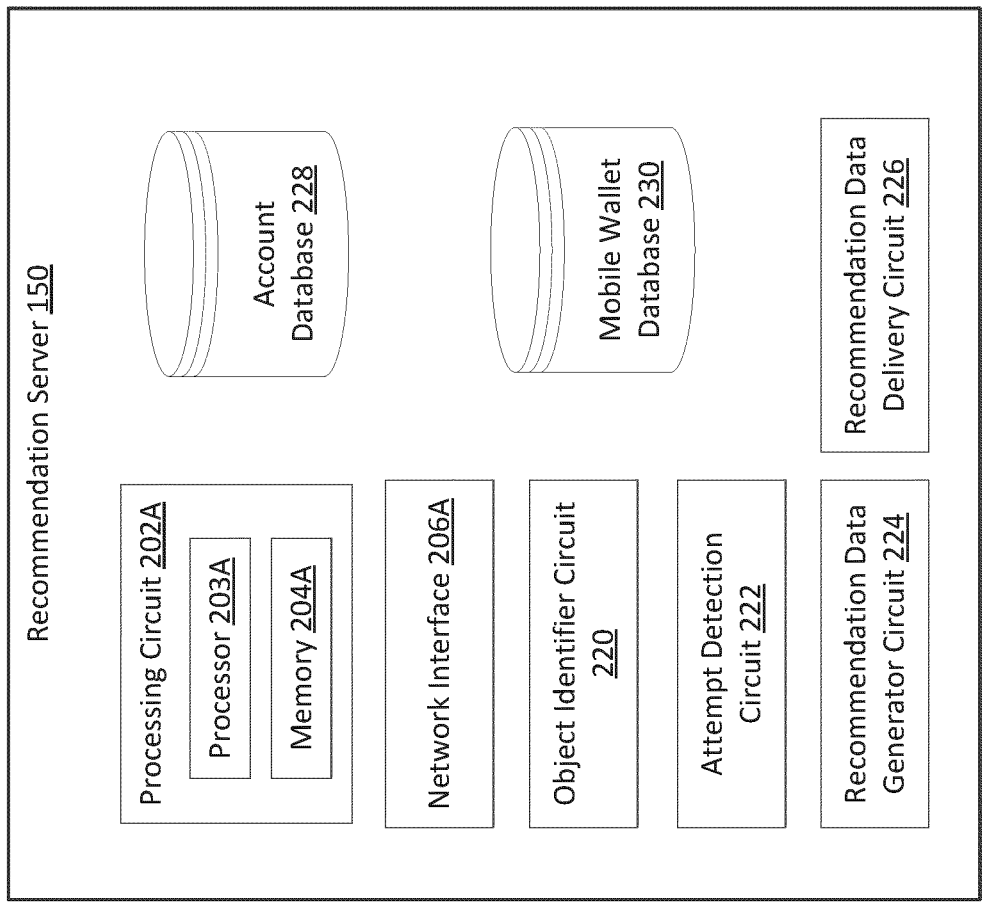
FIG. 2A is a block diagram depicting an example recommendation server of the environment in FIG. 1, according to some arrangements

FIG. 2A is a block diagram depicting an example recommendation server of the environment in FIG. 1, according to some arrangements. While various circuits, interfaces, and logic with particular functionality are shown, it should be understood that the recommendation server 150 includes any number of circuits, interfaces, and logic for facilitating the functions described herein. For example, the activities of multiple circuits are combined as a single circuit and implemented on a same processing circuit (e.g., processing circuit 202a), as additional circuits with additional functionality are included.

The recommendation server 150 includes a processing circuit 202a composed of a processor 203a and a memory device 204a. The processor 202a may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 203a may be a multi-core processor or an array of processors. The memory 204a (e.g., Random Access Memory (RAM), Read-Only Memory (ROM), Non-volatile RAM (NVRAM), Flash Memory, hard disk storage, optical media, etc.) stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processor 203a, controls the operations of the recommendation server 150. In some arrangements, the processor 203a and the memory 204a form various processing circuits described with respect to the recommendation server 150. The instructions include code from any suitable computer programming language such as, but not limited to, C, C++, C#, Java, JavaScript, VBScript, Perl, HTML, XML, Python, TCL, and Basic. In some arrangements, the recommendation server 150 may include an input/output circuit (not shown) for receiving/providing user input from/to the eyewear 108 and/or user device 110. In some arrangements (referred to as "headless servers"), the recommendation server 150 may omit the input/output circuit, but may communicate with the eyewear 108 and the user device 110 via network interface 206a.

The recommendation server 150 includes a network interface 206 configured to establish a communication session with a computing device (e.g., one or more user devices 110, one or more eyewear 108, or other recommendation servers 150) for sending and receiving data over the communication network 120 to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In many arrangements, the recommendation server 150 may include a plurality of network interfaces 206a of different types, allowing for connections to a variety of networks, such as local area networks or wide area networks including the Internet, via different sub-networks.

The recommendation server 150 includes an account database 228 that stores customer information and account information relating to one or more accounts held by the user 101 with the content provider 140. In this regard, more than one content provider (such as, but not limited to, content provider 140) with an associated recommendation server (such as, but not limited to, the recommendation server 150) may be communicably coupled to the components of FIG. 2B over the communication network 120 to access the accounts held by the user 101.

The recommendation server 150 includes a mobile wallet database 230 for storing mobile wallet accounts of users, including the user 101. The mobile wallet accounts permit payments via a mobile wallet client application (e.g., mobile wallet client application 280B, mobile wallet client application 280c) of the eyewear 108 and user device 110. In some implementations, the user 101 may send a transaction request for a consumer good and/or service from the eyewear 108 to mobile wallet client application 280c of user device 110. In some implementations, the user device 110 may send a transaction request for a consumer good and/or service from the eyewear 108 to mobile wallet client application 280c of user device 110 in response to a predetermined event, such as upon capturing visual data representing a view through a viewing area of the eyewear 108, or upon acquiring the geolocation of the eyewear 108. The mobile wallet database 230 stores transaction history of transactions made by the user 101 using the mobile wallet client application.

The recommendation server 150 includes an object identifier circuit 220 configured to identify an image of an object included in visual data (e.g., visual data 102). That is, the recommendation server 150 is configured to receive visual data 102 from a computing device (e.g., eyewear 108, user device 110, etc.) that is associated with user 101. The visual data 102 is analog or digital information representing the user's 101 view (e.g., the view depicted in FIG. 3A) of an object (e.g., consumer goods, a sign posting that advertises consumer goods and/or services, a parcel of real estate, etc.) through a viewing area (e.g., viewing area 304a of FIG. 3A) of the eyewear 108. In some implementations, the visual data 102 includes geolocation data indicating a geolocation of the eyewear 108. In response, the object identifier circuit 220 identifies an image of an object that is included in the visual data. For example, the user 101 may be on a lot of a car dealership contemplating purchasing a new car. As the user 101 views/inspects one of the dealer's red sports for sale, the eyewear 108 captures (e.g., generates) visual data 102 that represents the user's 101 view of the sports car through the eyewear 108. Thus, the object identifier circuit 220 may identify the red sports car in the visual data 102 sent from the eyewear 108.

In some arrangements, the object identifier circuit 220 may identify the image of the object included in the visual data 102 by determining that the object occupies a greater amount of the viewing area 304a (or the center area 306a)

of the eyewear 108 as compared to the amount of the viewing area 304a (or the center area 306a) occupied by the other objects. For example, the visual data 102 may include an image of a sports car occupying 60% of the viewing area 304a and an image of a truck occupying 10% of the viewing area 304a. The object identifier circuit 220 may determine the amounts of the viewing area 304a occupied by each of the objects (e.g., truck, sports car) in the visual data 102 and identify (select) the sports car based on it occupying a greater amount of the viewing area 304a than the truck.

In some implementations, the object identifier circuit 220 may identify the image of the object included in the visual data 102 by determining that the object occupies at least (equal to or greater than) a predetermined amount of the viewing area 304a of the eyewear 108. For example, the object identifier circuit 220 may identify the sports car because it occupies more than 50% of the viewing area 304a. A predetermined amount may be any amount between 1% and 100% of the viewing area 304a or the center area 306a of the eyewear 108. In some arrangements, the object identifier circuit 220 may identify the image of the object included in the visual data 102 by determining that the object occupies a foreground of the viewing area 102 of the eyewear 108. In some implementations, the object identifier circuit 220 may identify the image of the object included in the visual data 102 by identifying a product identifier that distinguishes the product from other products and/or services, such as a barcode, a Quick Response Code ("QR code"), an international standard book number (ISBN), a mark, a label, a symbol, a signature, or any other identifier that indicates a product type, a product manufacturer, a product brand, a product color, a product price, a product tax, product dimensions, a product quantity, a product quality rating, a service provider, a service quality rating, etc.

The object identifier circuit 220 may be configured to determine a product identifier associated with the identified object based on the visual data 102. For example, the object identifier circuit 220 extracts the image of the identified object from the visual data 102 and compares the extracted image to a database (not shown) of pre-stored images of known objects in order to determine a match. Each pre-stored image of known objects is associated with a product identifier (e.g., product type, product brand, etc.) identifying the known object. If a match to one of the pre-stored images is found, then the object identifier circuit 220 retrieves the product identifier associated with the matching pre-stored image and associates the retrieved product identifier with the extracted image (i.e., the identified object). In some arrangements, the object identifier circuit 220 may store the extracted image and its associated product identifier in a database (not shown). As another example, the object identifier circuit 220 may extract a barcode and/or QR code from the visual data 102 and retrieve the product identifier associated with the object from a database of barcodes and/or QR codes.

The recommendation server 150 includes an attempt detection circuit 222 configured to determine an attempt by the user 101 to purchase the object depicted in the visual data 102. That is, the recommendation server 150 may determine that a user 101 has made multiple visits to retailer 130, indicating that the user 101 is contemplating whether to purchase consumer goods and/or services provided offered by the retailer 130. In this regard, the attempt detection circuit 222 may be configured to determine an attempt by the user 101 to purchase the object by extracting the geolocation data 104 from the visual data 102 that it receives from either the eyewear 108 or user device 110. The attempt detection circuit 222 compares the extracted geolocation data 104 to a database (not shown) containing historical geolocation data that is associated with the account of the user 101 and counts the number of matches. Each match indicates that the user 101 visited the retailer 130 associated with the extracted geolocation data 104 on previous occasions. The attempt detection circuit 222 then compares the number of matches to a predetermined threshold (2 visits, 5 visits, 10 visits, etc.). If the number of matches is equal to or exceeds the predetermined threshold, then the attempt detection circuit 222 determine that the user 101 is preparing (attempting) to purchase the consumer goods and/or services at that retailer 130.

In some arrangements, the attempt detection circuit 222 may be configured to determine an attempt by the user 101 to purchase the object depicted in the visual data 102 by comparing the product identifier (e.g., product type, brand, barcode, etc.) that is associated with the object to contextual information that is associated with the account of the user. For example, the recommendation server 150 may maintain a contextual information database (not shown) containing contextual information acquired (e.g., extracted by the recommendation server 150) from one or more social media accounts associated with the user 101, one or more text messages associated with the user 101, and one or more transcripts of a voice call associated with the user 101. The attempt detection circuit 222 may compare the extracted geolocation data 104 to the contextual information database and counts the number of matches. Each match indicates that the user 101 has previously (i.e., prior to the user's 101 current visit of retailer 101) mentioned/discussed the geolocation indicated by the geolocation data 104 in any of the user's 101 social media accounts, text messages, and/or voice calls. The attempt detection circuit 222 then compares the number of matches to a predetermined threshold (2 visits, 5 visits, 10 visits, etc.). If the number of matches is equal to or exceeds the predetermined threshold, then the attempt detection circuit 222 determine that the user 101 is preparing (attempting) to purchase the consumer goods and/or services at that retailer 130.

The recommendation server 150 includes a recommendation data generator circuit 224 configured to generate, in response to determining an attempt of the user 101 to purchase an object depicted in the visual data 102, recommendation data (e.g., recommendation data 106) based on a product identifier associated with the object and an account associated with the user 101. That is, the recommendation data generator circuit 224 discovers, from an account of the user 101, a predetermined financial milestone that is associated with the user 101. For example, the recommendation data generator circuit 224 may discover that the user 101 is planning a European vacation with his family in the summertime or that the user 101 is planning to purchase a new sports car within the next couple of months. The recommendation data generator circuit 224 compares the predetermined financial milestone (e.g., vacation, sports car) to the price of the consumer goods and/or services that the user 101 is attempting to purchase and to the account of the user 101 in order to determine an affordability value associated with the user 101. The affordability value indicates whether the purchase of the object by the user 101 will hinder or prevent the user 101 from achieving the predetermined financial milestone by the timeline indicated by the user 101. The recommendation data generator circuit 224 then generates the recommendation data 106 based on this affordability value. For example, recommendation data generator circuit 224 discovers that the user 101 wants to take a vacation within three months and that the cost of such a vacation is $3,000. The recommendation data generator circuit 224 may review the financial details (e.g., income, expenses, taxes, etc.) stored in the accounts of the user 101 to discover whether the user 101 has the financial budget to purchase the consumer goods and/or services that the user 101 is attempting to purchase at the retailer 130, while still affording to go on vacation within three months.

Figure 3A:
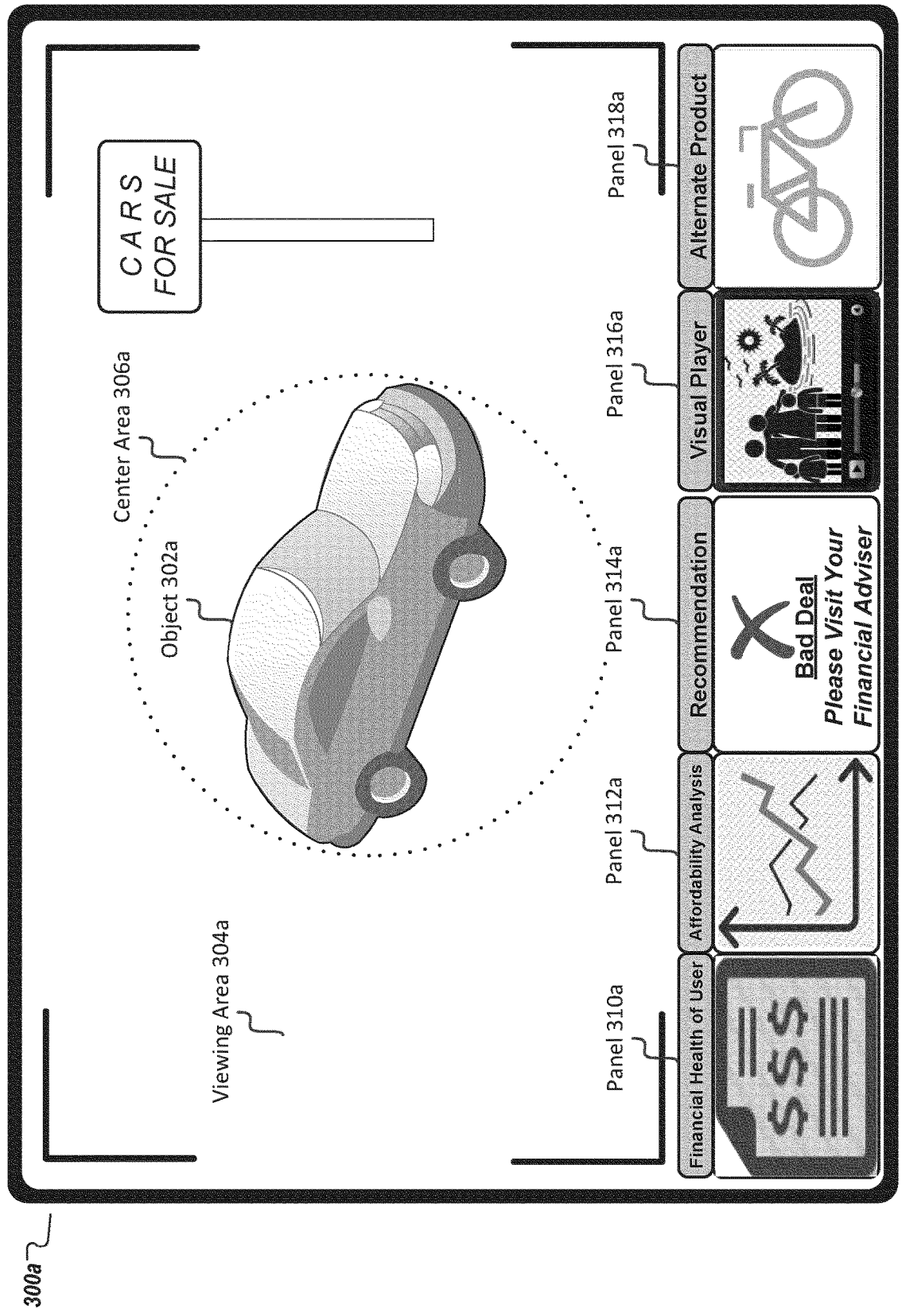
FIG. 3A is a block diagram depicting an example view through a viewing area of the AR device of the environment in FIG. 1, according to some arrangements.
Figure 3B:
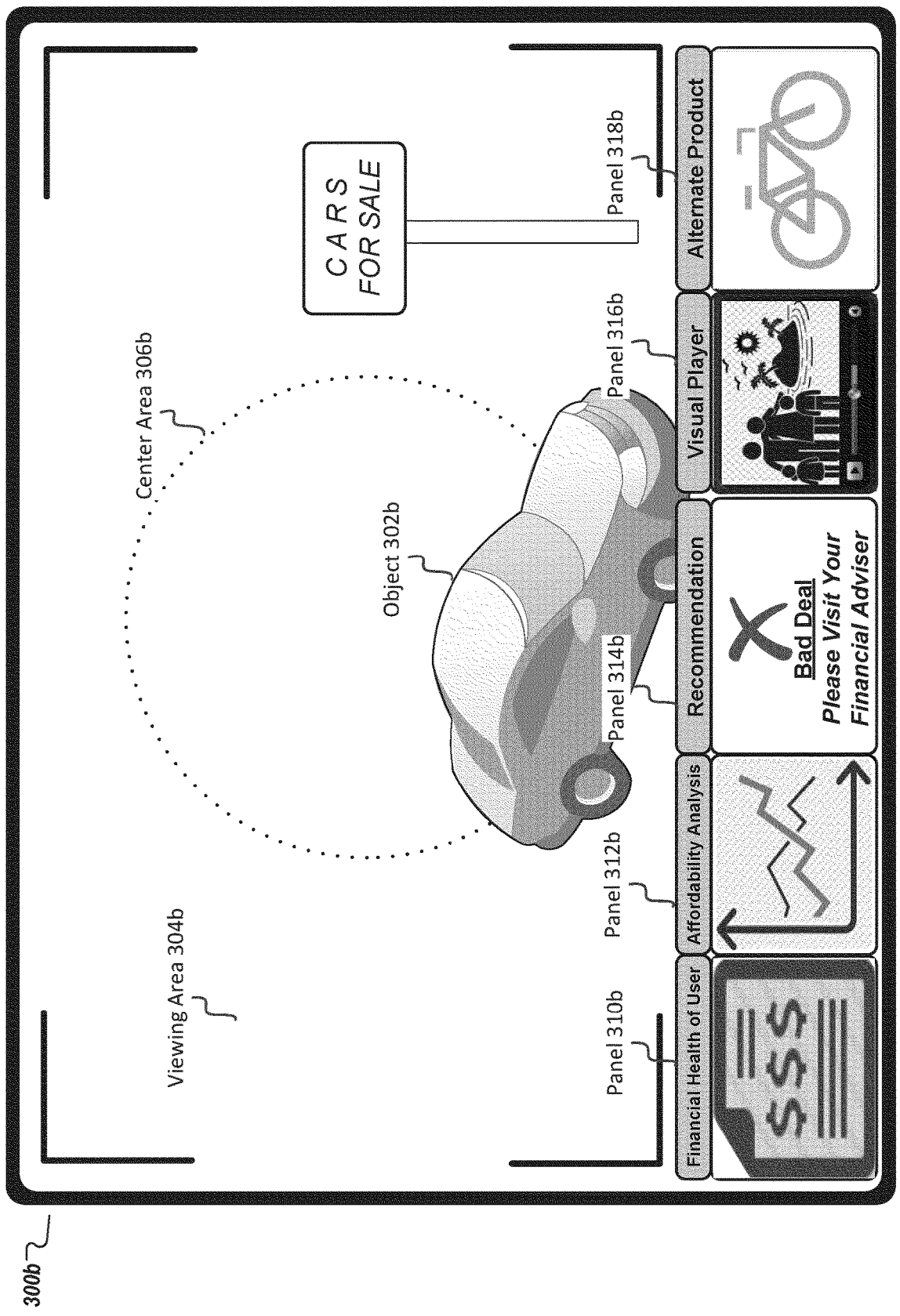
FIG. 3B is a block diagram depicting an example view through a viewing area of the AR device of the environment in FIG. 1, according to some arrangements.
Figure 3C:
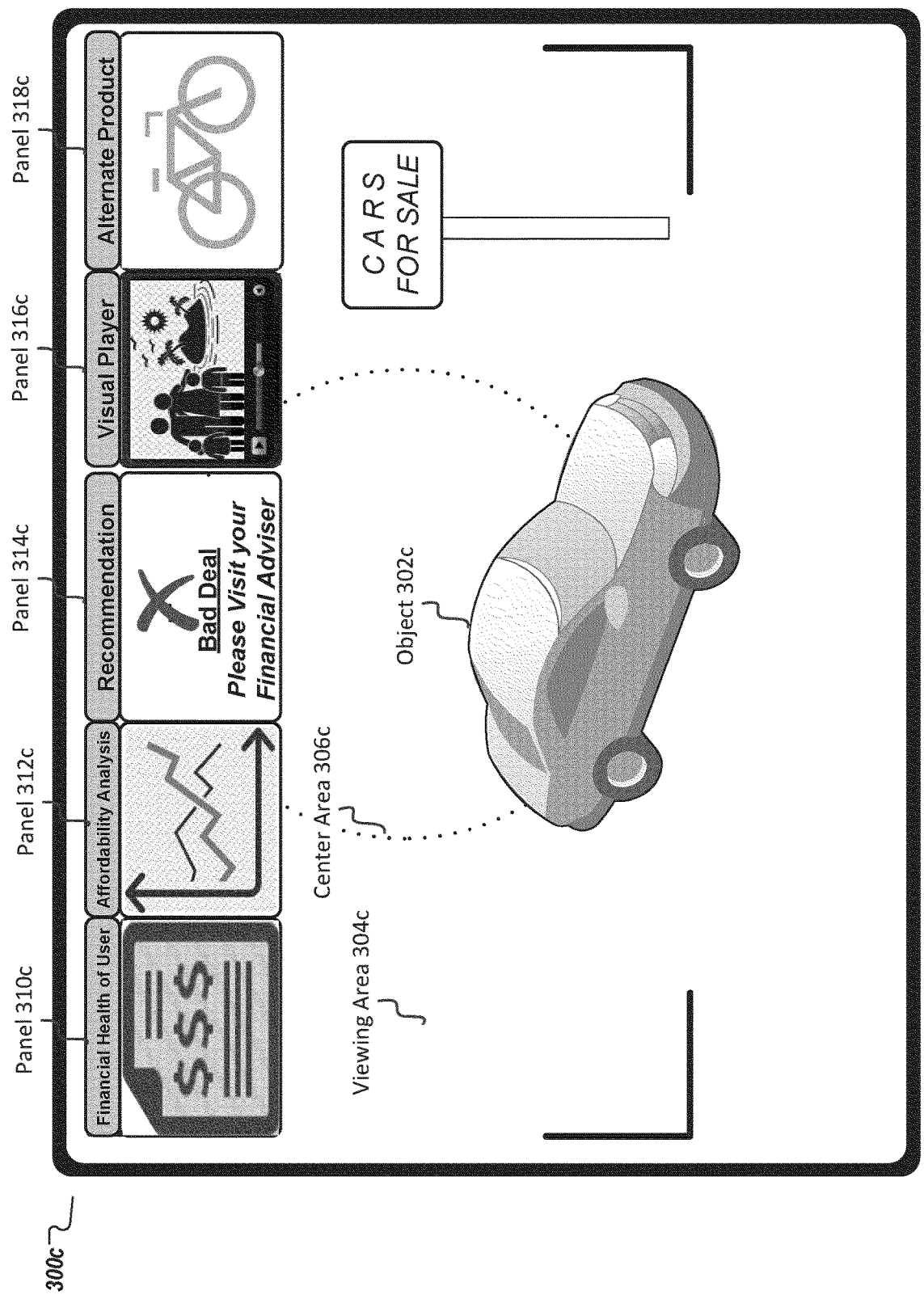
FIG. 3C is a block diagram depicting an example view through a viewing area of the AR device of the environment in FIG. 1, according to some arrangements.

The recommendation data generator circuit 224 generates the recommendation data 106 in a format that instructs (and causes) the eyewear 108, upon receipt of the recommendation data 106, to display the recommendation data 106 in panels 310a-c, 312a-c, 314a-c, 316a-c, 318a-c (as shown in FIGS. 3A-3C) on the viewing area (e.g., viewing area 304a-c as shown in FIGS. 3A-3C) of the eyewear 108. The recommendation data 106 shows the financial health (e.g., balances, income, expenses, etc.) of the user 101, an affordability analysis (e.g., tables, charts, graphs) indicating whether the user 101 can afford the consumer good and/or service the user 101 is attempting to purchase, a recommendation whether the user 101 should (i.e., affordable to the user 101) purchase the consumer goods and/or services, a visual player to play a digital video of the user enjoying the financial milestone, and cross-products (cheaper, more affordable for the user 101).

The recommendation data generator circuit 224 may generate scripts (or dynamic links to scripts) to include/insert into the recommendation data 106, which cause the eyewear 108 to display the recommendation data on the viewing area 304 of the eyewear 108. In some arrangements, the recommendation data generator circuit 224 generates the recommendation data 104 as an HTML file. In some implementations, recommendation data generator circuit 224 generates the recommendation data 106 as executable code that one or more processors of the eyewear 108 may execute upon receipt. In some implementations, the recommendation data 106 may causes the eyewear 108 to display the recommendation data 106 in a region (e.g., in panels 310a-c, 312a-c, 314a-c, 316a-c, and 318a-c in FIGS. 3A-3C) of the viewing area 304 of the eyewear 108 that is separate (i.e., not overlapping) from the region of the viewing area 304 occupied by the object the user 101 is attempting to purchase.

In some arrangements, the recommendation data generator circuit 224 generates the recommendation data 106 based on cross-product information that is associated with the object the user 101 is attempting to purchase. For example, the user 101 may be attempting to purchase a sports car at retailer 130. However, the recommendation data generator circuit 224 may determine that purchasing the sports car would prevent the user 101 have affording the vacation he plans to go on in three months. In response to determining the user's 101 affordability value, the recommendation data generator circuit 224 may select from a database (not shown) one or more cross-products, such as a less expensive sports car that the user 101 can afford and still achieve the financial milestone of going on vacation in three months. Accordingly, the recommendation data generator circuit 224 generates the recommendation data 106 based on the one or more cross-products it selects from the database, the product identifier of the sports car the user 101 is attempting to purchase, and the account associated with the user. The recommendation data 106 causes the eyewear—upon receipt of the recommendation data 106—to display the cross-product to the user 101 in a viewing area 304 of the eyewear 108.

In some arrangements, the recommendation data generator circuit 224 generates a digital video to deter/advise the user 101 from purchasing the object the user 101 is attempting to purchase, or encourage/advice the user 101 to purchase one of the cross-products instead. For example, the recommendation data generator circuit 224 discovers a predetermined financial milestone associated with the user, such as the user 101's goal of going on vacation. The recommendation data generator circuit 224 retrieves from a database (not shown) visual content associated with the user. This visual content may be gathered from content associated with the user that is posted online, such as social media accounts. Based on the visual content, the recommendation data generator circuit 224 generates a digital video that simulates the user 101 interacting with the object or environment (e.g., a beach location associated with the planned vacation) associated with the predetermined financial milestone. The recommendation data generator circuit 224 generates the recommendation data 106 based on the digital video, the product identifier, and the account associated with the user 101. The recommendation data 106 causes the eyewear—upon receipt of the recommendation data 106—to display (and play) the digital video to the user 101 in a viewing area 304 of the eyewear 108. In some arrangements, the recommendation data 106 causes the eyewear 108 to display an indicator (e.g., mark, symbol, text, color, etc.) deterring/advising the user from purchasing the consumer goods and/or service the user 101 is attempting to purchase. In some arrangements, the recommendation data 106 configures the eyewear 108, such that the user 101 may see the recommendation data 106 on the surface of a hand-held card (e.g., credit card, etc.) when viewing the hand-held card through the viewing area 304a of the eyewear 108.

The recommendation server 150 includes a recommendation data delivery circuit 226 configured to receive (via network interface 206a) recommendation data 106 from the recommendation data generator circuit 224 and deliver (via network interface 206a) the recommendation data 106 to the eyewear 108, which causes the eyewear 108 to display the recommendation data 106 in a viewing area 304 of the eyewear 108. In some arrangements, the recommendation data delivery circuit 226 may receive a list containing pointers (or links) to multiple sets of recommendation data 106 stored on a remote storage. As such, the recommendation data delivery circuit 226 fetches each set of recommendation data 106 via the link and delivers the fetched recommendation data 106 to the eyewear 108.

In some arrangements, the recommendation server 150 may be configured to receive, from the eyewear 108, a request to share (e.g., join user's 101 augmented reality experience) the recommendation data with a second eyewear 108 associated with a second user 101. In response, the recommendation server 150 may send the recommendation data 106 to the second eyewear 108 to cause the second eyewear 108 to display the recommendation data to the second user 101. In some arrangements, the second user 101 may be a member or employee of content provider 140 who is capable of providing assistance (e.g., questions about the user's 101 account information, loan options available to the user 101, answering questions about the consumer product and/or service, discuss impact purchasing the consumer goods and/or services on the user's 101 financial milestone) to the user 101 while the user 101 attempts to purchase the consumer goods and/or services. In some arrangements, the recommendation server 150 may be configured to negotiate rewards/discounts with the retailer 130 in response to determining that the user 101 is attempting to purchase consumer goods and/or services.

The recommendation server 150 includes a bus (not shown), such as an address/data bus or other communication mechanism for communicating information, which interconnects subsystems and devices, such as processing circuit 202a, processor 203a, memory 204a, network interface 206a, object identifier circuit 220, attempt detection circuit 222, recommendation data generator circuit 224, recommendation data delivery circuit 226, account database 228, mobile wallet database 230, or any other subsystem and device of recommendation server 150. In some arrangements, the recommendation server 150 may include one or more of any such components.

In some arrangements, some or all of the circuits of the recommendation server 150 may be implemented with the processing circuit 202a. For example, the network interface 206a, the object identifier circuit 220, the attempt detection circuit 222, the recommendation data generator circuit 224, the recommendation data delivery circuit 226, the account database 228, and the mobile wallet database 230 may be implemented as a software application stored within the memory 204a and executed by the processor 203a. Accordingly, such arrangement can be implemented with minimal or no additional hardware costs. In some arrangements, any of these above-recited circuits rely on dedicated hardware specifically configured for performing operations of the circuit.

Figure 2C:
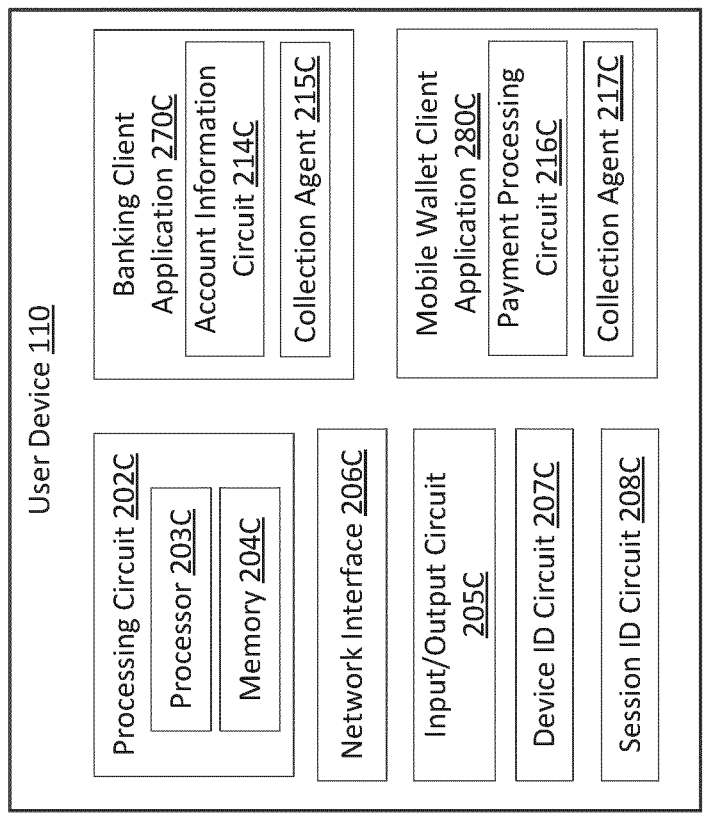
FIG. 2C is a block diagram depicting an example user device of the environment in FIG. 1, according to some arrangements.
Figure 2B:
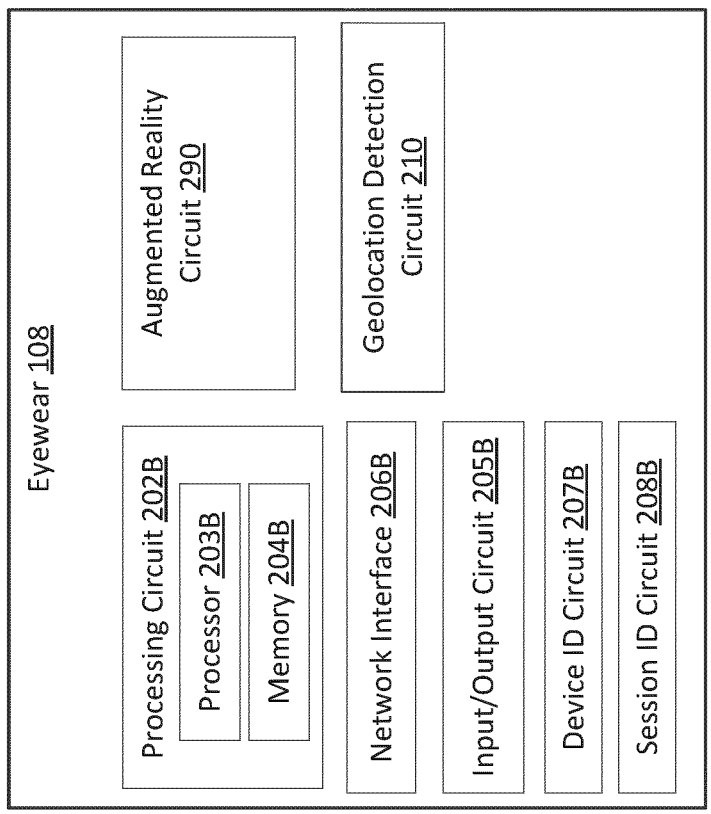
FIG. 2B is a block diagram depicting an example AR device of the environment in FIG. 1, according to some arrangements.

FIG. 2B is a block diagram depicting an example eyewear of the environment in FIG. 1, according to some arrangements. The user 101 operates (e.g., wears) or is associated with the eyewear 108. While various circuits, interfaces, and logic with particular functionality are shown, it should be understood that the eyewear 108 includes any number of circuits, interfaces, and logic for facilitating the functions described herein. For example, the activities of multiple circuits are combined as a single circuit and implemented on a same processing circuit (e.g., processing circuit 202b), as additional circuits with additional functionality are included.

In some arrangements, the eyewear 108 includes a processing circuit 202b having a processor 203b and memory 204b. The processor 203b is implemented as a general-purpose processor, a microprocessor, an ASIC, one or more FPGAs, a DSP, a group of processing components that are distributed over various geographic locations or housed in a single location or device, or other suitable electronic processing components. The memory 204b (e.g., RAM, NVRAM, ROM, Flash Memory, hard disk storage, etc.) stores data and/or computer instructions/code for facilitating the various processes described herein. Moreover, the memory 204b is or includes tangible, non-transient volatile memory or non-volatile memory. Accordingly, the memory 204b includes database components, object code components, script components, or any other type of information structure for supporting the various activities and information structures described herein. The instructions include code from any suitable computer programming language such as, but not limited to, C, C++, C#, Java, JavaScript, VBScript, Perl, HTML, XML, Python, TCL, and Basic.

The eyewear 108 includes a network interface 206 configured to establish a communication session with a computing device (e.g., one or more user devices 110, one or more recommendation servers 150, other eyewear 108) for sending and receiving data over the communication network 120 to the computing device. Accordingly, the network interface 206 is an interface such as, but not limited to, the network interface 206a in FIG. 2A.

The eyewear 108 includes an input/output circuit 205b configured to receive user input from and provide information to the user 101. In this regard, the input/output circuit 205b is configured to exchange data, communications, instructions, etc. with an input/output component of the eyewear 108. Accordingly, input/output circuit 205b may be any electronic device that conveys data to a user 101 by generating sensory information (e.g., a visualization on a display, one or more sounds, tactile feedback, etc.) and/or converts received sensory information from a user 101 into electronic signals (e.g., movement of the user 101, audio input from the user via a microphone, a touch screen display). The one or more user interfaces may be internal to the housing of eyewear 108, such as a built-in display on the viewing area of the eyewear 108, a touch screen display on the viewing area of the eyewear, a microphone, etc., or external to the housing of eyewear 108, such as a monitor connected to eyewear 108, a speaker connected to eyewear 108, etc., according to various arrangements. In some arrangements, the input/output circuit 205b includes communication circuitry for facilitating the exchange of data, values, messages, and the like between the input/output device 205b and the components of the eyewear 108. In some arrangements, the input/output circuit 205b includes machine-readable media for facilitating the exchange of information between the input/output device and the components of the eyewear 108. In still another arrangement, the input/output circuit 205b includes any combination of hardware components (e.g., a touchscreen), communication circuitry, and machine-readable media.

The eyewear 108 includes a device identification circuit 207b (shown in FIG. 2B as device ID circuit 207b) configured to generate and/or manage a device identifier associated with eyewear 108. The device identifier may include any type and form of identification used to distinguish the eyewear 108 from other eyewear 108. In some arrangements, a device identifier may be associated with one or more other device identifiers. In some arrangements, to preserve privacy, the device identifier may be cryptographically generated (via any hash function algorithm including, e.g., HMAC, SHA-1, SHA-2, SHA-3, MD2, MD4, and MD5), encrypted, or otherwise obfuscated by any circuit (e.g., processing circuit, device identification circuit 207, etc.) of user device 110. In some arrangements, any circuit of eyewear 108 may insert, pre-pend, append, or encode the device identifier to the visual data 102.

The eyewear 108 includes a session identification circuit 208b (shown in FIG. 2B as session ID circuit 208b) configured to generate and/or manage a session identifier associated with communication sessions between eyewear 108 and any other node/entity (e.g., the recommendation server 150, user device 110, other eyewear 108, etc.) on communication network 120. A session identifier may be similar to a device identifier, but generated more frequently, such as hourly, daily, upon activation of an application executing on the eyewear 108, or any other such period. A session identifier may be generated by the session ID circuit 208b or received from any other node/entity (e.g., the recommendation server 150, user device 110, and another eyewear 108) on communication network 120. A session identifier may be used in place of device identifiers to increase anonymity, or may be used in connection with device identifiers to distinguish interactions of one session from those of another session. In some arrangements, to preserve privacy, a session identifier may be cryptographically generated, encrypted, or otherwise obfuscated by any circuit of the eyewear 108.

The eyewear 108 includes a geolocation detection circuit 210 configured to determine the geolocation of the eyewear 108. An example geolocation may include Global Positioning Satellite (GPS) coordinates, a street number, a street name, a city, a state, and/or a country, a business location, etc. In some arrangements, the geolocation detection circuit 210 may be configured to send via personal area network 122 in FIG. 1 a request to user device 110 for the geolocation of the user device 110. The request causes the user device 110 to determine its own geolocation by querying its onboard or external geolocation detector (not shown) for geolocation data and sending the geolocation data to the eyewear 108. In some arrangements, the geolocation detection circuit 210 may be configured to send via personal area network 122 in FIG. 1 a request to user device 110 to send (e.g., forward along) visual data 102 and/or geolocation data 104 to the recommendation server 150, where the request includes the visual data 102 and/or geolocation data 104. The request causes the user device 110 to send the visual data 102 and/or geolocation data 104 it receives from the eyewear 108 to the recommendation server 150 via communication network 120.

The eyewear 108 includes an augmented reality circuit 290 configured to display the recommendation data 106 in a region of the viewing area of the eyewear 108 without obstructing the view of the object that the user 101 is currently viewing. For example, upon receipt of the recommendation data 106, the augmented reality circuit 290 assembles the recommendation data 106 based on executable instructions included in the recommendation data 106 and displays the recommendation data 106 one or more of the panels 310, 312, 314, 316, 318 (as shown in FIGS. 3A-3C) on the viewing area (e.g., viewing area 304*a-c* as shown in FIGS. 3A-3C) of the eyewear 108. In some arrangements, the augmented reality circuit 290 re-configures the eyewear 108 such that the user 101 may see the recommendation data 106 on the surface of a hand-held card (e.g., credit card, etc.) when viewing the surface of the hand-held card through the viewing area 304*a* of the eyewear 108. In some arrangements, the augmented reality circuit 290 may be configured to display the recommendation data 106 in a region of the viewing area of the eyewear 108 that overlaps (e.g., superimpose) the view of the object that the user 101 is currently viewing.

In some arrangements, the augmented reality circuit 290 may be configured to detect, in the viewing area of the eyewear, an overlap of the recommendation data 106 and the object. In response, the augmented reality circuit 290 may move the recommendation data 106 to a region of the viewing area of the eyewear to avoid the overlap.

In some arrangements, the eyewear 108 may be configured to receive recommendation data 106 from the user device 110 via the personal area network 122, causing the eyewear 108 to display the recommendation data in a viewing area (e.g., viewing area 304*a* in FIG. 3A) of the eyewear 108. In some arrangements, the eyewear 108 may be configured to send a request to the user device 110 requesting to share recommendation data 106 (associated with user 101) with a second eyewear (not shown) that is associated with a second user, where the request includes the recommendation data 106 and a device identifier associated with the second eyewear. The request causes the user device 110 to send the received recommendation data 106 to the second eyewear, which causes the second eyewear to display the recommendation data to the second user. In some arrangements, the eyewear 108 may be configured to send recommendation data 106 associated with user 101 to a second eyewear associated with a second user, which causes the second eyewear to display the recommendation data to the second user.

The eyewear 108 may include a microphone (not shown) and/or speakers (not shown) for communicating with members/employees of a content provider (e.g., content provider 140) and/or for listening during a playback of the recommendation data 106 received from content provider 140.

The eyewear 108 includes a bus (not shown), such as an address/data bus or other communication mechanism for communicating information, which interconnects subsystems and devices, such as processing circuit 202*b*, processor 203*b*, memory 204*b*, network interface 206, input/output circuit 205*b*, device ID circuit 207*b*, session ID circuit 208*b*, augmented reality circuit 290, geolocation detection circuit 210, or any other subsystem and device of the eyewear 108. In some arrangements, the eyewear 108 may include one or more of any such components.

In some arrangements, the eyewear 108 may be configured to include logic and circuitry that is similar to the logic and circuitry of the recommendation server 150. For example, the eyewear 108 may include one or more of an object identifier circuit (not shown) having similar features and functionality as the object identifier circuit 220 in FIG. 2A, an attempt detection circuit (not shown) having similar features and functionality as the attempt detection circuit 222 (not shown) in FIG. 2A, and/or a recommendation data generator circuit (not shown) having similar features and functionality as the recommendation data generator circuit 224 (not shown) in FIG. 2A. In some arrangements, the eyewear 108 may locally store account information associated with user 101 and/or locally store a plurality of identifiers of known objects. Accordingly, the eyewear 108 may provide real-time notifications on affordability and advisability of purchasing goods or services using augmented reality without using the recommendation server 150.

In some arrangements, some or all of the circuits of the eyewear 108 may be implemented with the processing circuit 202*b*. For example, the subsystems and devices of the eyewear 108 may be implemented as a software application stored within the memory 204*b* and executed by the processor 203*b*. Accordingly, such arrangement can be implemented with minimal or no additional hardware costs. In some arrangements, any of these above-recited circuits rely on dedicated hardware specifically configured for performing operations of the circuit.

FIG. 2C is a block diagram depicting an example user device of the environment in FIG. 1, according to some arrangements. The user 101 operates or is associated with the user device 110. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., processing circuit 202), as additional circuits with additional functionality are included.

In some arrangements, the user device 110 includes a processing circuit 202*c* having a processor 203*c* and memory 204*c*. The processor 203*c* is implemented as a general-purpose processor, a microprocessor, an ASIC, one or more FPGAs, a DSP, a group of processing components that are distributed over various geographic locations or housed in a single location or device, or other suitable electronic processing components. The memory 204*c* (e.g., RAM, NVRAM, ROM, Flash Memory, hard disk storage, etc.) stores data and/or computer instructions/code for facilitating the various processes described herein. Moreover, the memory 204c is or includes tangible, non-transient volatile memory or non-volatile memory. Accordingly, the memory 204c includes database components, object code components, script components, or any other type of information structure for supporting the various activities and information structures described herein. The instructions include code from any suitable computer programming language such as, but not limited to, C, C++, C#, Java, JavaScript, VBScript, Perl, HTML, XML, Python, TCL, and Basic.

The user device 110 includes a network interface 206c configured to establish a communication session with a computing device (e.g., one or more eyewear 108, one or more recommendation servers 150, another user device 110) for sending and receiving data over the communication network 120 to the computing device. Accordingly, the network interface 206c is an interface such as, but not limited to, the network interface 206a in FIG. 2A.

The user device 110 includes an input/output circuit 205c configured to receive user input from and provide information to the user 101. In this regard, the input/output circuit 205c is structured to exchange data, communications, instructions, etc. with an input/output component of the user device 110. Accordingly, input/output circuit 205c may be any electronic device that conveys data to a user 101 by generating sensory information (e.g., a visualization on a display, one or more sounds, tactile feedback, etc.) and/or converts received sensory information from a user 101 into electronic signals (e.g., a keyboard, a mouse, a pointing device, a touch screen display, a microphone, etc.). The one or more user interfaces may be internal to the housing of user device 110, such as a built-in display, touch screen, microphone, etc., or external to the housing of user device 110, such as a monitor connected to user device 110, a speaker connected to user device 110, etc., according to various arrangements. In some arrangements, the input/output circuit 205c includes communication circuitry for facilitating the exchange of data, values, messages, and the like between the input/output device and the components of the user device 110. In some arrangements, the input/output circuit 205c includes machine-readable media for facilitating the exchange of information between the input/output device and the components of the user device 110. In still another arrangement, the input/output circuit 205c includes any combination of hardware components (e.g., a touchscreen), communication circuitry, and machine-readable media.

The user device 110 includes a device identification circuit 207c (shown in FIG. 2C as device ID circuit 207c) configured to generate and/or manage a device identifier associated with user device 110. The device identifier may include any type and form of identification used to distinguish the user device 110 from other user devices 110. In some arrangements, a device identifier may be associated with one or more other device identifiers. In some arrangements, to preserve privacy, the device identifier may be cryptographically generated, encrypted, or otherwise obfuscated by any circuit (e.g., processing circuit, device identification circuit 207, etc.) of user device 110. In some arrangements, any circuit of user device 110 may insert, pre-pend, append, or encode the device identifier to the recommendation data 106 it receives from the recommendation server 150 and sends to the eyewear 108, or to the visual data 102 it receives from the eyewear 108 and sends to the recommendation server 150.

The user device 110 includes a session identification circuit 208c (shown in FIG. 2C as session ID circuit 208c) configured to generate and/or manage a session identifier associated with communication sessions between user device 110 and any other node/entity (e.g., eyewear 108, the recommendation server 150, other user devices 110, etc.) on communication network 120. A session identifier may be similar to a device identifier, but generated more frequently, such as hourly, daily, upon activation of an application executing on user device 110 (e.g., banking client application 270c, mobile wallet client application 280c), or any other such period. A session identifier may be generated by the session ID circuit 208c or received from any other node/entity (e.g., the recommendation server 150, eyewear 108) on communication network 120. A session identifier may be used in place of device identifiers to increase anonymity, or may be used in connection with device identifiers to distinguish interactions of one session from those of another session. In some arrangements, to preserve privacy, a session identifier may be cryptographically generated, encrypted, or otherwise obfuscated by any circuit of the user device 110.

The user device 110 includes (or executes) a banking client application 270c that is communicably coupled to the recommendation server 150 via the communication network 120 and is configured to permit management of at least one account of the user 101 via the banking client application 270c. In this regard, the banking client application 270c is configured to send/receive data between user device 110 and the recommendation server 150, and display data within the banking client application 270c that is indicative of the account information, as discussed herein. Further, in some arrangements, the banking client application 270c is configured to process payments from the user 101 to a designated recipient. For example, the banking client application 270c depicts a loan (e.g., mortgage) of the user 101 and allows the user 101 to pay the loan from an account (e.g., checking or savings). In some examples, a bill pay option is provided by the banking client application 270c, where the bill pay option allows the user 101 to pay his/her bills in response to user input. The banking client application 270c may be an internet/web browser, a graphic user interface (GUI), an email reader/client, and a File Transfer Protocol (FTP) client, or a banking client application independent from an internet/web browser.

As mentioned herein, via the banking client application 270C, the user 101 pays bills (e.g., mortgage, etc.), view balances, pays merchants, and otherwise manage their account. Accordingly and as shown in FIG. 2C, the banking client application 270c includes an account information circuit 214c. The account information circuit 214c is linked or otherwise coupled to one or more accounts (as stored in the account database 228 in FIG. 2A) held by the user 101 and permit management of the associated accounts (e.g., transfer balances between accounts, view payment history, etc.) by communicating with the recommendation server 150. The banking client application 270c is communicably coupled to the mobile wallet client application 280c. As such, in response to a mobile payment via the mobile wallet client application 280c, the mobile wallet client application 280c causes the banking client application 270c to update the payment account (i.e., the account that supported the mobile payment). As such, the applications 270c and 280c are communicably coupled to each other to enable actions supported by each respective application.

The banking client application 270c includes a collection agent 215c. Collection agent 215c may include an application plug-in, application extension, subroutine, browser toolbar, daemon, or other executable logic for collecting data processed by banking client application 270c and/or monitoring interactions of user 101 with input/output circuit 205c. In other arrangements, collection agent 215c may be a separate application, service, daemon, routine, or other executable logic separate from banking client application 270c but configured for intercepting and/or collecting data processed by banking client application 270c, such as a screen scraper, packet interceptor, API hooking process, or other such application.

The collection agent 215c is configured for intercepting or receiving data input via input/output circuit 205c, including mouse clicks, scroll wheel movements, gestures such as swipes, pinches, or touches, or any other such interactions; as well as data received and processed by banking client application 270c. The collection agent 215c (or collection agent 217c, as discussed herein), may begin intercepting/ gathering/receiving data input via its respective input/output circuit based on any triggering event, including, e.g., a power-up of user device 110, a launch of any software application executing on a processor of user device 110, or the receipt of recommendation data 106 from the recommendation server 150.

Any data received/intercepted/read/generated by collection agent 215c (or collection agent 217c, as discussed herein), device identification circuit 207c, and session identification circuit 208c may be shared between any circuit of user device 110. Any circuit of user device 110 may each assemble all or any portion of the shared data into a data collection referred to herein as "user interaction data" In many implementations, to preserve privacy, the user interaction data may be cryptographically generated, encrypted, or otherwise obfuscated by any circuit of user device 110. In some arrangements, any circuit of user device 110 may insert, pre-pend, append, or encode the user interaction data to visual data 102 that it receives from eyewear 108 and sends to the recommendation server 150.

The mobile wallet client application 280c is communicably coupled to the recommendation server 150 via the communication network 120 and is configured to facilitate purchases by the user 101 via the mobile wallet client application 280c. Accordingly, the mobile wallet client application 280c is linked or otherwise connected with one or more accounts (as stored in the account database 228 in FIG. 2A) of the user 101. In operation, when at a point-of-sale terminal, the user 101 initiates the mobile wallet client application 280c and provides a passcode (e.g., biometrics such as a thumbprint, a Personal Identification Number (PIN), a password, etc.) to authenticate the user 101 and select the source payment account desired (e.g., a checking account from a particular content provider that is linked to the mobile wallet client application 280c). By way of communication with the payment terminal (e.g., via near field communication), the aforementioned payment information is provided to the POS terminal or the merchant (e.g., via NFC, via barcode presentment, etc.) and the payment is processed. Beneficially, carrying payment cards are avoided or reduced via the mobile wallet client application 280c.

As mentioned herein, the mobile wallet client application 280c is configured to facilitate and permit payments by interfacing with an account held by the user 101 at the recommendation server 150. Accordingly, the mobile wallet client application 280c is communicably coupled via the network interface 206c over the communication network 120 to the recommendation server 150. As shown, the mobile wallet client application 280c includes a payment processing circuit 216C structured to facilitate payments by the user 101 via the mobile wallet client application 280c. For example, the payment processing circuit 216C enables a quick-pay capability with a merchant or retailer (retailer 130 in FIG. 1). In this regard, the payment processing circuit 216C includes or is communicably coupled with a communication device (e.g., a near-field communication chip) that facilitates the exchange of information between the mobile wallet client application 280c and a POS terminal.

The mobile wallet client application 280c includes a collection agent 217c. The collection agent 217c is configured for intercepting or receiving data (herein referred to as "user interaction data") input via input/output circuit 205c, as well as data received and processed by mobile wallet client application 280c. The collection agent 217c is a collection agent such as, but not limited to, the collection agent 215c.

One or more of the banking client application 270c or mobile wallet client application 280c are server-based applications executable on the user device 110. In this regard, the user 101 has to first download the application(s) prior to usage. In another arrangement, the banking client application 270c and/or mobile wallet client application 280c are coded into the memory 204c of the user device 110. In still another arrangement, the banking client application 270c and/or mobile wallet client application 280c are web-based interface applications. In this configuration, the user 101 has to log onto or otherwise access the web-based interface before usage. In this regard, at least one of the banking client application 270c and mobile wallet client application 280c is supported by a separate computing system comprising one or more servers, processors, network interface modules, etc. that transmit the applications for use to the user device 110. In certain arrangements, one or more of the banking client application 270c and/or mobile wallet client application 280c include an Application Programming Interface (API) and/or a Software Development Kit (SDK) that facilitate integration of other applications. All such variations and combinations are intended to fall within the spirit and scope of the present disclosure.

In some arrangements, the user device 110 may be configured to receive via personal area network 122 in FIG. 1 a request from eyewear 108 for the geolocation of the user device 110. In response, the user device 110 determines its own geolocation by querying its on-board or external geolocation detector (not shown) for geolocation data and send the geolocation data to the eyewear 108. In some arrangements, the user device 110 may be configured to receive via personal area network 122 in FIG. 1 a request from eyewear 108 to send visual data 102 and/or geolocation data 104 to the recommendation server 150, where the request includes the visual data 102 and/or geolocation data 104. In response, the user device 110 sends the received visual data 102 and/or geolocation data 104 to the recommendation server 150 via communication network 120. In some arrangements, the user device 110 may be configured to receive a request via communication network 120 from the recommendation server 150 to send recommendation data 106 to user device 110. In response, the user device 110 sends the received recommendation data 106 to user device 110 via the personal area network 122. In some arrangements, the user device 110 may be configured to receive a request from eyewear 108 to share recommendation data 106 with a second eyewear (not shown) associated with a second user, where the request includes the recommendation data 106 and a device identifier associated with the second eyewear. In response, the user device 110 sends the received recommendation data 106 to the second eyewear to cause the second eyewear to display the recommendation data to the second user.

The user device 110 includes a bus (not shown), such as an address/data bus or other communication mechanism for communicating information, which interconnects subsystems and devices, such as processing circuit 202c, processor 203c, memory 204c, network interface 206c, input/output circuit 205c, device ID circuit 207c, session ID circuit 208c, banking client application 270c, mobile wallet client application 280c, or any other subsystem and device of the user device 110. In some arrangements, the user device 110 may include one or more of any such components.

In some arrangements, some or all of the circuits of the user device 110 may be implemented with the processing circuit 202c. For example, the subsystems and devices of user device 110 may be implemented as a software application stored within the memory 204c and executed by the processor 203c. Accordingly, such arrangement can be implemented with minimal or no additional hardware costs. In some arrangements, any of these above-recited circuits rely on dedicated hardware specifically configured for performing operations of the circuit.

FIG. 3A is a block diagram depicting an example view through a viewing area of the eyewear of the environment in FIG. 1, according to some arrangements. FIG. 3B is a block diagram depicting an example view through a viewing area of the eyewear of the environment in FIG. 1, according to some arrangements. FIG. 3C is a block diagram depicting an example view through a viewing area of the eyewear of the environment in FIG. 1, according to some arrangements. The views 300a, 300b, 300c (collectively referred to herein as "views 300a-c") include a viewing area 304a, 304b, 304c (collectively referred to herein as viewing area 304a-c) and a center area 306a, 306b, 306c (collectively referred to herein as center area 306a-c) occupying a first region of the viewing area 304a-c. In some arrangements, the center area 306a-c occupies the center of the viewing area 304a-c. In some arrangements, the center area 306a-c may occupy any other region of the viewing area 304a-c, despite the region not being centered in the viewing area 304a-c. The views 300a-c also includes an object 302a, 302b, 302c (collectively referred to herein as object 302a-c) that the user 101 is viewing through the eyewear 108 and contemplating to purchase.

The views also include a row of panels 310a, 310b, 310c (collectively referred to herein as panels 310a-c); panels 312a, 312b, 312c (collectively referred to herein as panels 312a-c); panels 314a, 314b, 314c (collectively referred to herein as panels 314a-c); panels 316a, 316b, 316c (collectively referred to herein as panels 316a-c); and panels 318a, 318b, 318c (collectively referred to herein as panels 318a-c) that each occupy a second region of the viewing area 304a-c. Panels 310a-c display the financial health of the user 101 based on the user's 101 account information. Panels 312a-c display the affordability analysis (populated with an "affordability value," as discussed herein) generated by the recommendation server 150. Panels 314a-c display the recommendation server's 150 recommendation to user 101 with regard to whether the user 101 should purchase the consumer goods and/or services that the user 101 is attempting to purchase. Panels 316a-c display (and plays) a digital video that simulates the user 101 interacting with an object or environment (e.g., a beach location associated with the planned vacation) associated with a predetermined financial milestone of the user 101. Panels 318a-c display cross-products associated with the consumer goods and/or services that the user 101 is attempting to purchase in order to encourage/advise the user 101 to purchase one of the cross-products instead. In some arrangements, the cross-products cost less to purchase as compared to the consumer goods and/or services that the user 101 is attempting to purchase. In some arrangements, the cross-products cost more to purchase as compared to the consumer goods and/or services that the user 101 is attempting to purchase. In some arrangements, the cross-products are of a higher quality (e.g., higher construction, higher durability, higher consumer rating/reputation, etc.) as compared to the quality of the consumer goods and/or services that the user 101 is attempting to purchase. In some arrangements, 310a-c, 312a-c, 314a-c, 316a-c, 318a-c may be in any order and/or may include more or less number of panels than shown in FIGS. 3A-3C.

As shown in FIG. 3A, panels 310a-c, 312a-c, 314a-c, 316a-c, 318a-c are positioned within view 310a-c to avoid overlapping with object 302a. However, in some arrangements such as FIG. 3B, displaying recommendation data 106 within eyewear 108 may result in an overlap of panels 310a-c, 312a-c, 314a-c, 316a-c, 318a-c onto object 302b. In response, the augmented reality circuit (e.g., the augmented reality circuit 290 in FIG. 2B) may be configured to detect, in the viewing area 304b of eyewear 108, an overlap of the recommendation data 106 (as shown in panels 310b, 312b, 314b, 316b, 318b) and the object 302b. In response, the augmented reality circuit 290 may move the recommendation data 106 to a region of the viewing area of the eyewear to avoid the overlap. For example, as shown in FIG. 3C, the augmented reality circuit 290 may move the recommendation data 106 (as shown in panels 310c, 312c, 314c, 316c, 318c) from the bottom portion of the view (e.g., view 300b) to the top portion of the view (e.g., view 300c). As a result of the move, the recommendation data 106 (as shown in panels 310c, 312c, 314c, 316c, 318c) does not overlap with the object 302c. In some arrangements, the augmented reality circuit 290 may move the recommendation data 106 (and panels 310c, 312c, 314c, 316c, 318c) to any (e.g., left-side, right-side, upper-side, lower-side, etc.) region of the view 300c.

Figure 4:
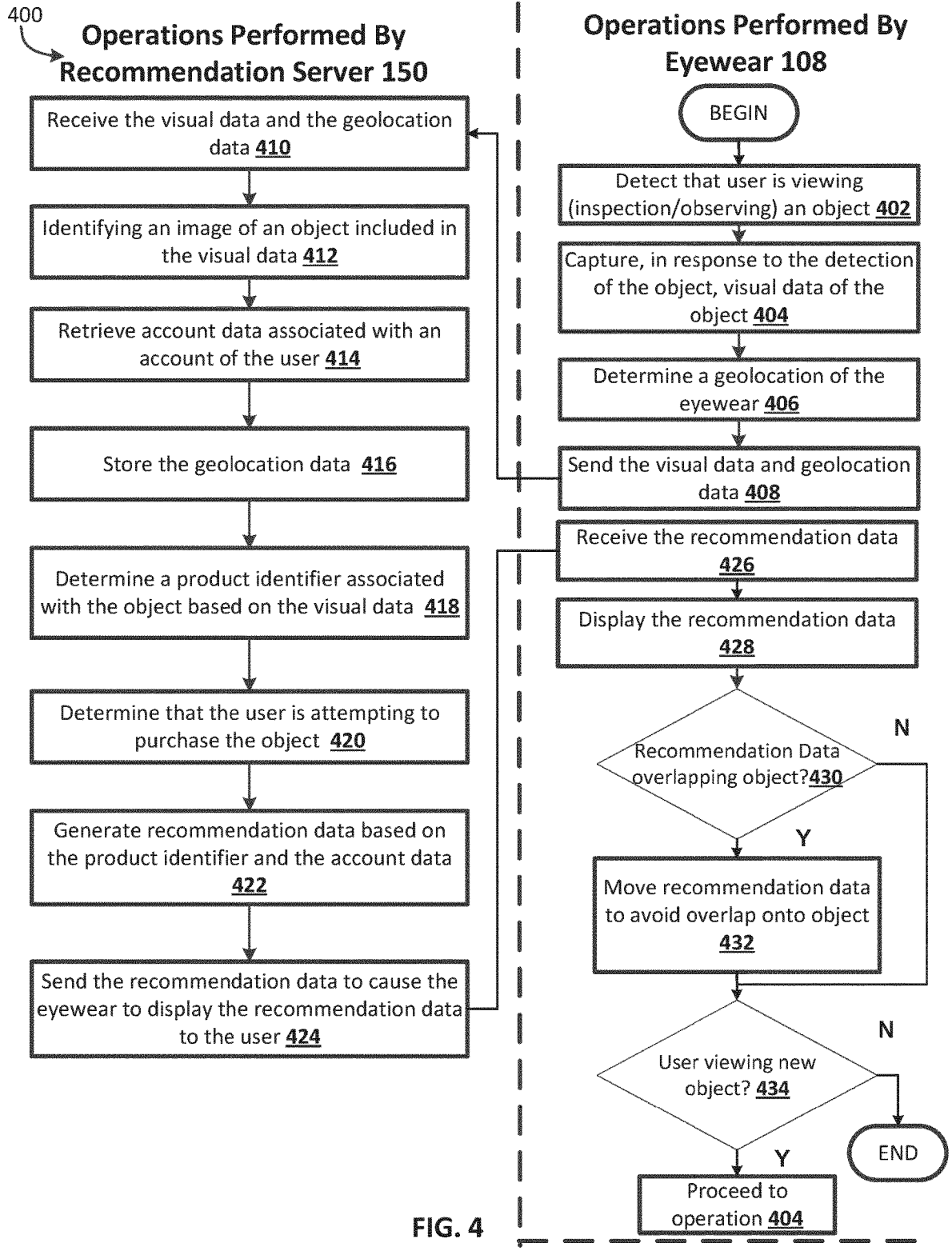
FIG. 4 is a flow diagram depicting a method for providing real-time notifications on affordability and advisability of purchasing goods or services using augmented reality, according to some arrangements.

FIG. 4 is a flow diagram depicting a method for providing real-time notifications on affordability and advisability of purchasing goods or services using augmented reality, according to some arrangements. In some arrangements, the method 400 may be performed by the eyewear 108 and the recommendation server 150 in FIG. 1. In particular, eyewear 108 performs operations 402, 404, 406, 408, 426, 428, 430, 432, and 434, and the recommendation server 150 performs operations 410, 412, 414, 416, 418, 420, 422, and 424. Each operation may be re-ordered, added, removed, or repeated.

As shown, the method 400 begins with operation 402, where the eyewear 108 detects that the user 101 is viewing (e.g., inspection/observing) an object through the viewing area 304a of the eyewear 108. At operation 404, the eyewear 108 captures in response to the detection of the object, visual data (e.g., visual data 102) of the object. At operation 406, the eyewear 108 determines a geolocation of the eyewear 108. At operation 408, the eyewear 108 sends the visual data 102 and the geolocation data 104 to the recommendation server 150.

At operation 410, the recommendation server 150 receives the visual data 102 and the geolocation data 104 from the eyewear 108. At operation 412, the recommendation server 150 identifies an image of an object included (or depicted) in the visual data 102. At operation 414, the recommendation server 150 retrieves account data associated with an account of the user 101. At operation 416, the recommendation server 150 stores the geolocation data in a database. At operation 418, the recommendation server 150 determines from the visual data a product identifier (e.g., product type, brand, barcode, etc.) that is associated with the object. At operation 420, the recommendation server 150 determines that the user 101 is attempting to purchase the object in the visual data 102. At operation 422, the recommendation server 150 generates recommendation data 106 based on the product identifier and the account data of the user 101. At operation 424, the recommendation server 150 sends the recommendation data 106 to the eyewear 108, which causes the eyewear 108 to display the recommendation data 106 to the user 101 in a region (e.g., in one or more of the panels 310, 312, 314, 316, and 318 in FIGS. 3A-3C) of the viewing area (e.g., viewing area 304 in FIGS. 3A-3C) of the eyewear 108.

At operation 426, the eyewear 108 receives the recommendation data 106 from the recommendation server 150. At operation 428, the eyewear 108 displays the recommendation data in one or more of the panels 310, 312, 314, 316, and 318 of the eyewear 108. At operation 430, the eyewear 108 determines whether the recommendation data 106 overlaps (intercepts, obstructs) the object, obstructing the user's 101 view of the object through the eyewear 108. If the recommendation server 150 determines that the recommendation data overlaps the object, then the eyewear 108 moves the panels (populated with content from the recommendation data 106) to another region of the viewing area 304 of the eyewear 108 to eliminate the occurrence of the overlap or to minimize the degree of overlay. Upon completing the move, the eyewear 108 proceeds to operation 432. Otherwise, if no overlap occurs, then the eyewear 108 proceeds to operation 434 without moving one or more panels 310, 312, 314, 316, and 318, and/or the recommendation data 106. At operation 434, the eyewear 108 detects whether the user 101 is viewing a new object. If the eyewear 108 detects that the user 101 is viewing a new object, then eyewear 108 proceeds to operation 404. Otherwise, the eyewear 108 ends process 400.

Figure 5:
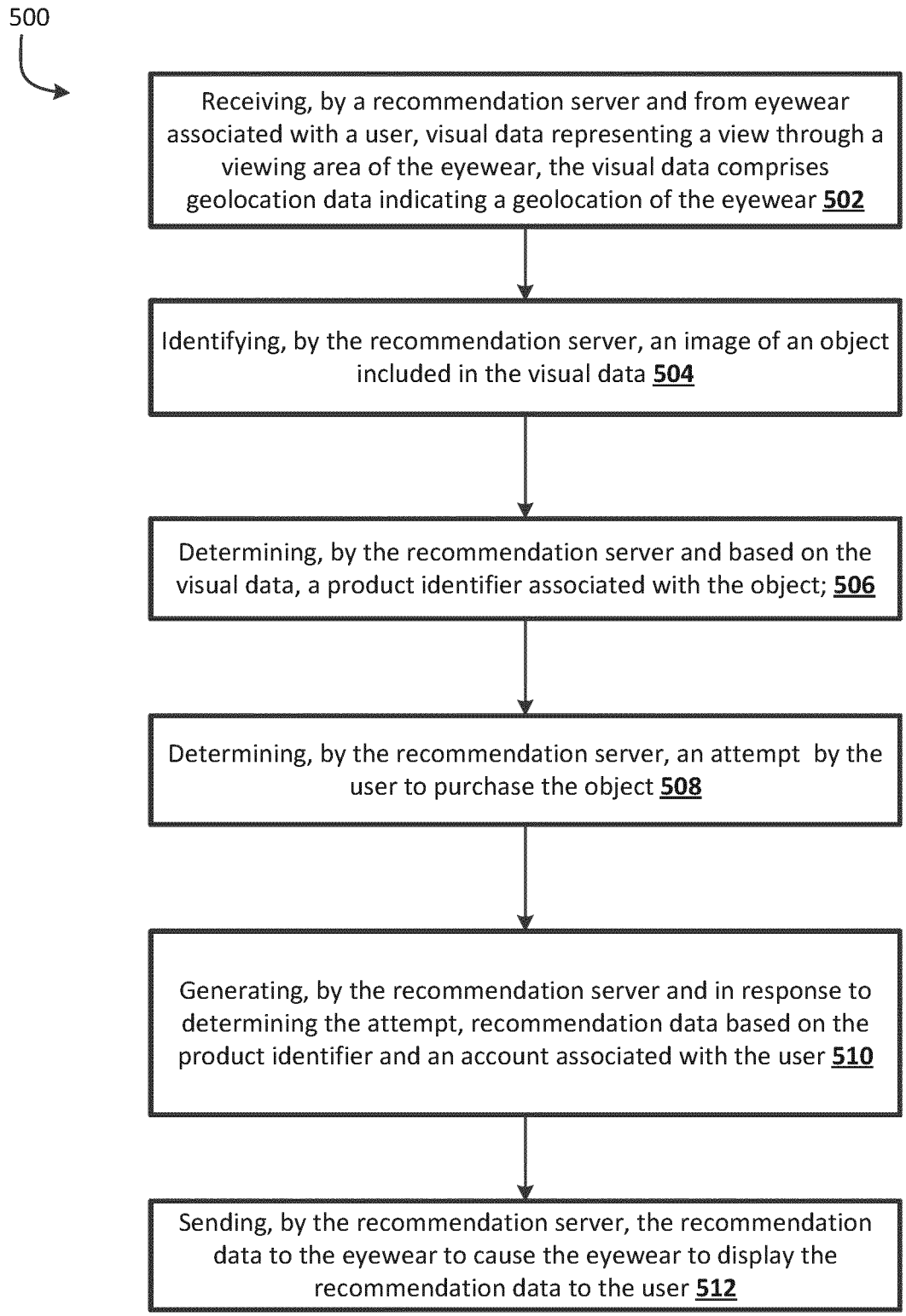
FIG. 5 is a flow diagram depicting a method for providing real-time notifications on affordability and advisability of purchasing goods or services using augmented reality, according to some arrangements.

FIG. 5 is a flow diagram depicting a method for providing real-time notifications on affordability and advisability of purchasing goods or services using augmented reality, according to some arrangements. In some arrangements, some or all operations of method 500 may be performed by a recommendation server, such as the recommendation server 150 in FIG. 1. In some arrangements, some or all operations of method 500 may be performed by eyewear, such as the eyewear 108 in FIG. 1.

As shown, the method 500 begins with operation 502 where the recommendation server 150 performs an operation of receiving, from eyewear associated with a user, visual data representing a view through a viewing area of the eyewear, the visual data comprises geolocation data indicating a geolocation of the eyewear. At operation 504, the recommendation server 150 performs an operation of identifying an image of an object included in the visual data. At operation 506, the recommendation server 150 performs an operation of determining, based on the visual data, a product identifier associated with the object. At operation 508, the recommendation server 150 performs an operation of determining an attempt by the user to purchase the object. At operation 510, the recommendation server 150 performs an operation of generating, in response to determining the attempt, recommendation data based on the product identifier and an account associated with the user. At operation 512, the recommendation server 150 performs an operation of sending, by the recommendation server, the recommendation data to the eyewear to cause the eyewear to display the recommendation data to the user.

Figure 6:
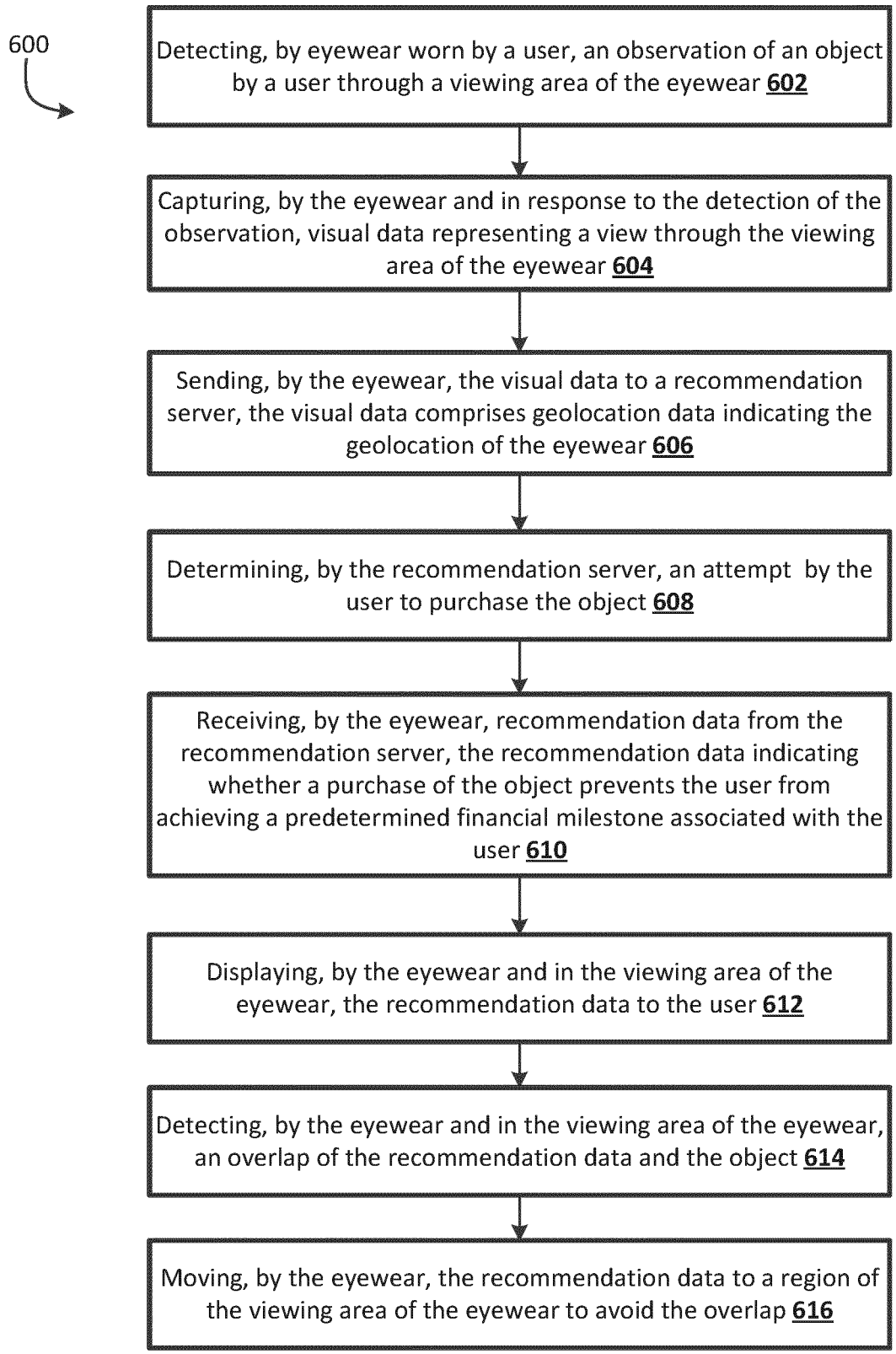
FIG. 6 is a flow diagram depicting a method for providing real-time notifications on affordability and advisability of purchasing goods or services using augmented reality, according to some arrangements.

FIG. 6 is a flow diagram depicting a method for providing real-time notifications on affordability and advisability of purchasing goods or services using augmented reality, according to some arrangements. In some arrangements, some or all operations of method 500 may be performed by eyewear worn by a user 101, such as the eyewear 108 in FIG. 1.

As shown, the method 600 begins with operation 602 where the eyewear 108 performs an operation of detecting an observation of an object by a user through a viewing area of the eyewear. At operation 604, the eyewear 108 performs an operation of capturing, in response to the detection of the observation, visual data representing a view through the viewing area of the eyewear. At operation 606, the eyewear 108 performs an operation of sending the visual data to a recommendation server, the visual data comprises geolocation data indicating the geolocation of the eyewear. At operation 608, the eyewear 108 performs an operation of receiving recommendation data from the recommendation server, the recommendation data indicating whether a purchase of the object prevents the user from achieving a predetermined financial milestone associated with the user. At operation 610, the eyewear 108 performs an operation of displaying, in the viewing area of the eyewear, the recommendation data to the user. At operation 612, the eyewear 108 performs an operation of detecting, in the viewing area of the eyewear, an overlap of the recommendation data and the object. At operation 614, the eyewear 108 performs an operation of moving the recommendation data to a region of the viewing area of the eyewear to avoid the overlap.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method of providing real-time notifications on affordability and advisability of purchasing goods or services using augmented reality (AR), the method comprising:
   receiving, by a recommendation server and from an AR device associated with a user, visual data representing a view through a viewing area of the AR device, the visual data comprising geolocation data indicating a geolocation of the AR device;
   identifying, by the recommendation server, an image of an object included in the visual data, wherein the image is identified by determining the object occupies at least a predetermined amount of the viewing area of the AR device;
   determining, by the recommendation server and based on the visual data, a product identifier associated with the object, wherein determining the product identifier includes extracting the image from the visual data and comparing the extracted image to a database of stored images to determine a match;

determining, by the recommendation server, a retailer associated with the geolocation of the AR device, wherein determining the retailer includes extracting the geolocation data from the visual data and comparing the extracted geolocation data to a database of retailer geolocation data to determine a match;

determining, by the recommendation server, an attempt by the user to purchase the object based on historical geolocation data associated with an account of the user indicating that a number of user visits to the retailer indicated by the geolocation data of the AR device equals or exceeds a predetermined number of visits threshold;

extracting, by the recommendation server, contextual data from a social media account associated with the user;

comparing, by the recommendation server, the product identifier associated with the object and the contextual data;

based on comparing the product identifier and the contextual data, generating, by the recommendation server and in response to determining the attempt, recommendation data based on the product identifier and the account of the user, wherein generating the recommendation data comprises:

discovering, by the recommendation server and based on the account of the user, a milestone purchase item and a timeline associated with purchasing the milestone purchase item;

comparing, by the recommendation server, a user defined budget, a price of the milestone purchase item, purchase data associated with a purchase of the object, and the account of the user to determine an affordability value, wherein the affordability value indicates whether the purchase of the object prevents the user from purchasing the milestone purchase item in accordance with the timeline and the user defined budget; and generating, by the recommendation server, the recommendation data based on the affordability value; and sending, by the recommendation server, the recommendation data to the AR device to cause the AR device to:

display the recommendation data to the user, wherein the recommendation data is displayed by the AR device in a first region of the viewing area of the AR device separate from a second region of the viewing area of the AR device occupied by the object;

detect, in the viewing area of the AR device, an overlap of the recommendation data and the object; and move the recommendation data to a region of the viewing area of the AR device to avoid the overlap.

2. The method of claim 1, wherein identifying the object comprises:

determining the object occupies the predetermined amount of the viewing area within a predetermined region of the viewing area of the AR device.

3. The method of claim 1, wherein identifying the object comprises:

determining the object occupies a foreground of the viewing area of the AR device.

4. The method of claim 1, wherein determining the product identifier comprises:

comparing, by the recommendation server, the extracted image to a plurality of images stored in the database of stored images to identify an image of the plurality of images matching the extracted image, wherein each image of the plurality of images comprises a known object; and retrieving, by the recommendation server and from the database of stored images, the product identifier, the product identifier associated with the image of the plurality of images.

5. The method of claim 1, wherein determining the attempt by the user to purchase the object comprises:

extracting, by the recommendation server, the geolocation data from the visual data;

comparing, by the recommendation server, the extracted geolocation data and the historical geolocation data associated with the account of the user to determine a number of matches indicative of the number of user visits; and determining, by the recommendation server, the number of matches exceeds the predetermined number of visits threshold.

6. The method of claim 1, wherein further contextual data is extracted from at least one of, a text message and a transcript of a voice call.

7. The method of claim 1, wherein generating the recommendation data comprises:

selecting, by the recommendation server based on the affordability value, a cross-product associated with the product identifier; and generating, by the recommendation server, the recommendation data based on the cross-product, the product identifier, and the account associated with the user; and wherein the recommendation data comprising the cross-product is displayed by the AR device to the user.

8. The method of claim 1, wherein generating the recommendation data comprises:

retrieving, by the recommendation server and from a database of content, visual content associated with the user;

generating, by the recommendation server and based on the visual content, a digital video simulating the user interacting with the milestone purchase item, the milestone purchase item associated with a predetermined financial milestone; and generating, by the recommendation server, the recommendation data based on the digital video, the product identifier, and the account associated with the user;

wherein the recommendation data causes the AR device to display the digital video to the user.

9. The method of claim 1, wherein the recommendation data is displayed by the AR device to display an indicator deterring the user from purchasing the object.

10. The method of claim 1, further comprising:

receiving, by the recommendation server and from the AR device, a request to share the recommendation data with a second AR device associated with a second user; and sending, by the recommendation server, the recommendation data to the second AR device to cause the second AR device to display the recommendation data to the second user.

11. A system for providing real-time notifications on affordability and advisability of purchasing goods or services using augmented reality (AR), the system comprising a recommendation server configured to:

receive from an AR device associated with a user, visual data representing a view through a viewing area of the AR device, the visual data comprises geolocation data indicating a geolocation of the AR device;

identify an image of an object included in the visual data, wherein the image is identified by determining the object occupies at least a predetermined amount of the viewing area of the AR device;

determine, based on the visual data, a product identifier associated with the object, wherein determining the product identifier includes extracting the image from the visual data and comparing the extracted image to a database of stored images to determine a match;

determine a retailer associated with the geolocation of the AR device, wherein determining the retailer includes extracting the geolocation data from the visual data and comparing the extracted geolocation data to a database of retailer geolocation data to determine a match;

determine an attempt by the user to purchase the object based on historical geolocation data associated with an account of the user indicating that a number of user visits to the retailer indicated by the geolocation of the AR device equals or exceeds a predetermined number of visits threshold;

extract contextual data from a social media account associated with the user;

compare the product identifier associated with the object and the contextual data;

based on comparing the product identifier and the contextual data, generate, in response to determining the attempt, recommendation data based on the product identifier and the account associated with the user, wherein generating the recommendation data causes the recommendation server to:

discover, based on the account of the user, a milestone purchase item and a timeline associated with purchasing the milestone purchase item;

compare a user defined budget, a price of the milestone purchase item, purchase data associated with a purchase of the object, and the account of the user to determine an affordability value, wherein the affordability value indicates whether the purchase of the object prevents the user from purchasing the milestone purchase item in accordance with the timeline and the user defined budget; and generate the recommendation data based on the affordability value: and send the recommendation data to the AR device to cause the AR device to:

display the recommendation data to the user, wherein the recommendation data is displayed by the AR device in a first region of the viewing area of the AR device separate from a second region of the viewing area of the AR device occupied by the object;

detect, in the viewing area of the AR device, an overlap of the recommendation data and the object; and move the recommendation data to a region of the viewing area of the AR device to avoid the overlap.

12. The system of claim 11, wherein the recommendation server is further configured to at least one of:

determine the object occupies the predetermined amount of the viewing area within a predetermined region of the viewing area of the AR device; and determine the object occupies a foreground of the viewing area of the AR device.

13. The system of claim 11, wherein the recommendation server is further configured to:

compare the extracted image to a plurality of images stored in the database of stored images to identify an image of the plurality of images matching the extracted image, wherein each image of the plurality of images comprises a known object; and retrieve, from the database of stored images, the product identifier, the product identifier associated with the image of the plurality of images.

14. The system of claim 11, wherein the recommendation server is further configured to:

extract the geolocation data from the visual data;

compare the extracted geolocation data and the historical geolocation data associated with the account of the user to determine a number of matches indicative of the number of user visits; and determine the number of matches exceeds the predetermined number of visits threshold.

15. The system of claim 11, wherein further contextual data is extracted from at least one of a text message and a transcript of a voice call.

16. The system of claim 11, wherein the recommendation server is further configured to:

select, based on the affordability value, a cross-product associated with the product identifier; and generate the recommendation data based on the cross-product, the product identifier, and the account associated with the user, and wherein the recommendation server is configured to send the recommendation data to the AR device to display the cross-product and an indicator deterring the user from purchasing the object.

17. The system of claim 11, wherein the recommendation server is further configured to:

retrieve, from a database of content, visual content associated with the user;

generate, based on the visual content, a digital video simulating the user interacting with the milestone purchase item, the milestone purchase item associated with a financial milestone; and generate the recommendation data based on the digital video, the product identifier, and the account associated with the user; and wherein the recommendation server is configured to send the recommendation data to the AR device to display the digital video to the user.

* * * * *